United States Patent [19]

Muegge et al.

[11] Patent Number: 5,655,149
[45] Date of Patent: Aug. 5, 1997

[54] SYSTEM FOR IDENTIFYING A PRIMARY PROCESSOR AND NON-PRIMARY PROCESSORS AFTER SYSTEM REBOOT INDEPENDENT OF PROCESSOR POSITIONS AND WITHOUT USING DEFAULT PRIMARY PROCESSOR IDENTIFICATION

[75] Inventors: Shad William Muegge; Paul Henderson, both of Novato; Mark Stolp, Petaluma, all of Calif.

[73] Assignee: Harris Corporation, Melbourne, Fla.

[21] Appl. No.: 678,950

[22] Filed: Jul. 12, 1996

Related U.S. Application Data

[63] Continuation of Ser. No. 257,890, Jun. 10, 1994, abandoned.

[51] Int. Cl.$^6$ ................................................ G06F 13/00
[52] U.S. Cl. ........................ 395/830; 395/823; 395/828; 395/829; 395/284
[58] Field of Search ........................ 395/427, 162, 395/200.01, 182.21, 800, 830, 823, 828, 829, 284

[56] References Cited

U.S. PATENT DOCUMENTS

| | | | |
|---|---|---|---|
| 4,688,212 | 8/1987 | MacGinitie et al. | 370/85 |
| 5,204,669 | 4/1993 | Dorfe et al. | 340/825.52 |
| 5,321,813 | 6/1994 | McMillen et al. | 395/182.09 |
| 5,444,695 | 8/1995 | Copley et al. | 370/17 |
| 5,491,788 | 2/1996 | Cepulis et al. | 395/182.11 |

FOREIGN PATENT DOCUMENTS

| | | |
|---|---|---|
| 5-128032 | 5/1993 | Japan. |
| 5-173987 | 7/1993 | Japan. |
| 5-225145 | 9/1993 | Japan. |

*Primary Examiner*—Thomas C. Lee
*Assistant Examiner*—Le Hien Luu
*Attorney, Agent, or Firm*—Sughrue, Mion, Zinn, Macpeak & Seas

[57] ABSTRACT

An integrated network switch system which can uniquely and consistently detect and designate each processor on a bus without the relative position information, and allow a dynamic reallocation of the processors according to their designations. A pseudo code residing within each processor is implemented to effect the detecting and designating operation of the integrated network switch system. Additionally, a shared RAM and a hardware register which are made accessible to all processors on the bus at a fixed location are used to assist the designating operation of the system, and each processor's memory is used to assist the delaying operation of the system. This assures that tasks among the processors are distributed according to their designations, and that each of the processors can be removed or added without any hard coded configuration.

10 Claims, 14 Drawing Sheets

FIG.1

| CABINET 3 | | | | CABINET 2 | | | | CABINET 1 | | | | CABINET 4 | | | |
|---|---|---|---|---|---|---|---|---|---|---|---|---|---|---|---|
| JKL 192 PORTS | POWER SUPPLY | JKL 192 PORTS | POWER SUPPLY | JKL 192 PORTS | POWER SUPPLY | COMMON EQUIPMENT SHELF 1 | POWER SUPPLY | JKL 192 PORTS | POWER SUPPLY |
| JKL 192 PORTS | POWER SUPPLY | JKL 192 PORTS | POWER SUPPLY | COMMON EQUIPMENT SHELF 2 | POWER SUPPLY | JKL 192 PORTS | POWER SUPPLY |
| JKL 192 PORTS | POWER SUPPLY | JKL 192 PORTS | POWER SUPPLY | COMMON EQUIPMENT SHELF 3 | POWER SUPPLY | JKL 192 PORTS | POWER SUPPLY |
| 220 VAC POWER SUPPLY | 220 VAC POWER SUPPLY | 220 VAC POWER SUPPLY | 220 VAC POWER SUPPLY |

FIG.11a
HALF-FRAME MODE
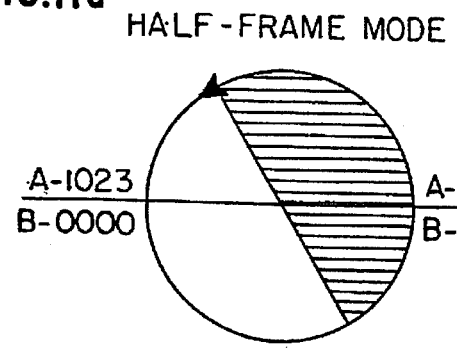
WRITE POINTER = A-0700
READ = B-0700 TO A-699
FIG.11b
HALF-FRAME MODE
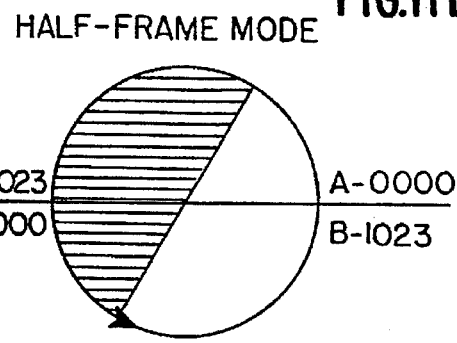
WRITE POINTER = B-0300
READ = A-0300 TO B-0299
FIG.12a
FULL-FRAME MODE
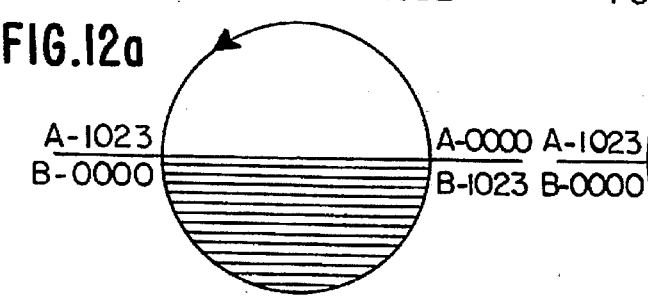
WRITE POINTER = A-0700
READ = B-0000 TO B-1023
FIG.12b
FULL-FRAME MODE
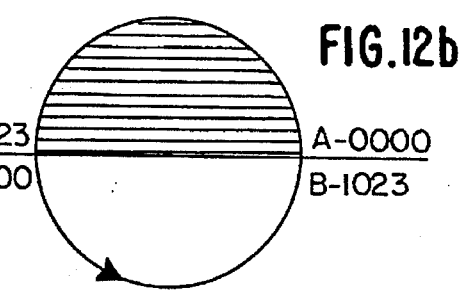
WRITE POINTER = B-0300
READ = A-0000 TO A-1023
FIG.13

FIG. 14
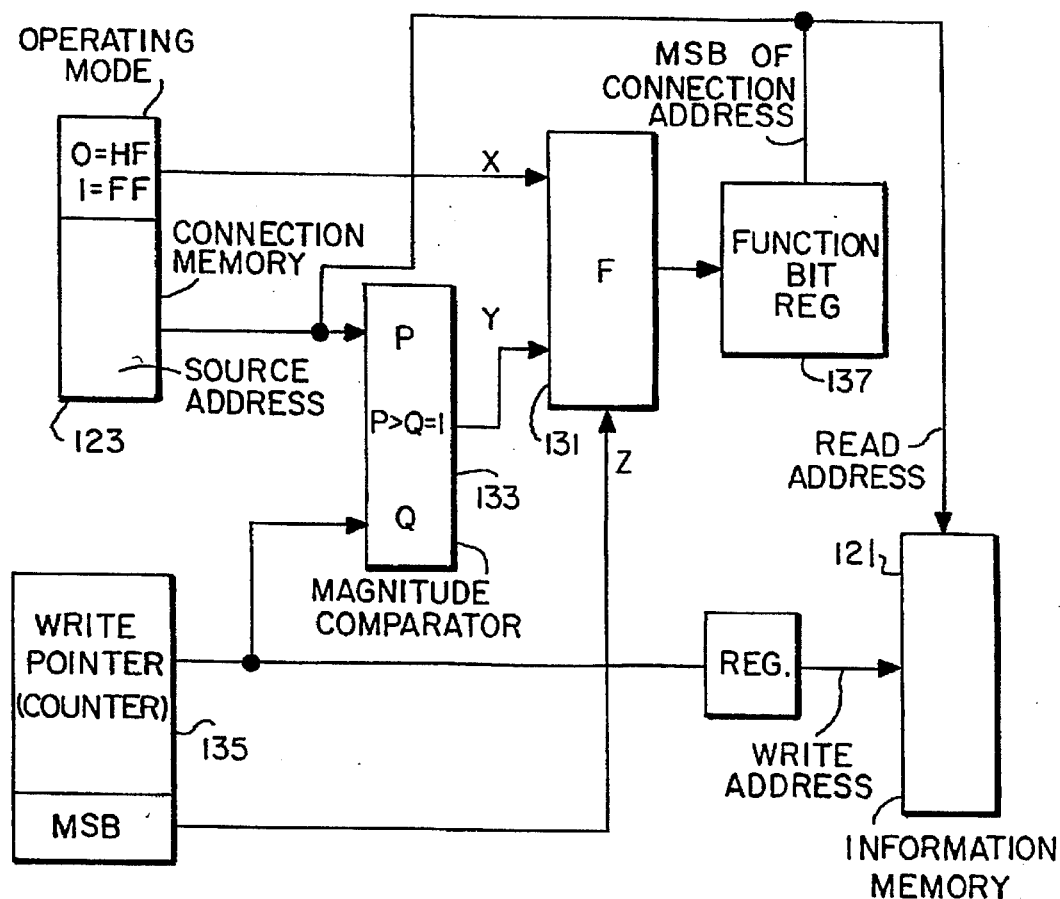
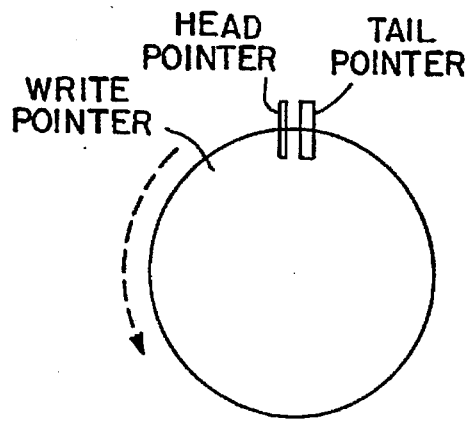
FIG. 15a
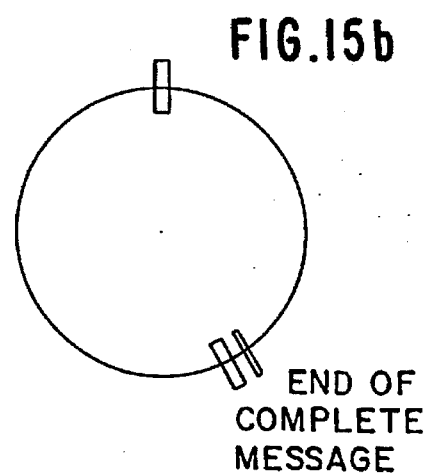
FIG. 15b

SYSTEM FOR IDENTIFYING A PRIMARY PROCESSOR AND NON-PRIMARY PROCESSORS AFTER SYSTEM REBOOT INDEPENDENT OF PROCESSOR POSITIONS AND WITHOUT USING DEFAULT PRIMARY PROCESSOR IDENTIFICATION

This is a continuation of application Ser. No. 08/257,890 filed Jun. 10, 1994, now abandoned.

This application is related to U.S. application Ser. Nos.:

Ser. No. 08/257,855 of Steven Weir for Integrated Network Switch With Flexible Serial Data Packet Transfer System, now pending;

Ser. No. 08/520,004 (an FWC of 08/257,886, now abandoned) of Steven Weir for Mixed Mode Switching With Selectable Full Frame/Half Frame, now pending;

Ser. No. 08/257,887 of Karen Bell and John Monteschio for Integrated Network Switch Having Universal Shelf Architecture With Flexible Shelf Mapping, now pending;

Ser. No. 08/257,889 of Steven Weir for Integrated Network Switch With Large Capacity Switch Architecture Using Selectable Interfaces Between Peripherals and Switch Memories, now U.S. Pat. No. 5,583,856.

1. Field of the Invention

This invention relates to integrated network switches and more particularly to integrated network switches which use standard multiplex-compatible PCM for voice functions and also support a wide range of data function.

2. Background of the Invention

One conventional integrated network switch is represented by the 20-20® integrated network switch manufactured by Harris Corporation. This integrated network switch, the subject of U.S. Pat. No. 4,688,212 which issued on Aug. 18, 1987 to MacGinitie et al. and assigned to Harris Corporation, accommodates both the North American (μ-Law) and the European (A-Law) multiplex equipment, while processing both synchronous and asynchronous circuit- and packet-switched data up to 2 Mbits/s.

A complete understanding of the invention described hereinafter will be facilitated with a description of the construction and operation of the 20-20 switch. The hardware of this microprocessor based system includes peripheral cards bearing telephony interface units which contain circuits for lines, trunk, and service units. Service units may be DTMF receivers, MF receivers, serial interface units and the like. A common controller interconnects to the peripheral cards through a telephony bus. The common controller consists of a telephony control unit (TCU) and a call processor unit (CPU).

The integrated network switch can provide up to 2048 ports and accommodate up to 1920 non-blocking peripheral devices, such as telephones, printers, modems, tape drives, data devices and the like, grouped into port groups as will be described. Each port group contains up to 32 peripheral interface units and is associated with a port group bus, the port group buses forming a portion of the telephony bus to be described. Thus, 60 port group buses are provided to accommodate 1920 peripheral devices (32×60=1920). The remaining 128 ports, corresponding to 4 additional port groups, are allocated to tone and conference functions.

The peripheral circuits are coupled to a telephony control unit (TCU) through the telephony bus, which as will be explained in more detail herein below is actually a large set of small buses that form a part of a multiplexing tree. The telephony bus connects all line, trunk, other telephony and data feature units to the telephony controller and also provides timing for codecs and similar devices. The telephony control unit mediates all communications between the-peripherals and the call processor unit (CPU) of the common controller. Thus, the call processor unit and the telephony control unit together constitute a common control for the peripherals. Therefore, the integrated network switch can be viewed generally as consisting of (1) telephony peripherals, (2) a telephony bus tree, and (3) a common controller containing a telephony controller unit (TCU) and a call processor unit (CPU). The peripherals communicate with the TCU through the telephony bus tree, and subsequently with the CPU through the TCU.

The telephone control unit (TCU) not only mediates all communications between the call processor unit and the peripherals, it also scans the peripherals for service requests, provides the switched voice/data connections to devices, and provides timing for the PCM, codecs, and data. The TCU appears to the call processor unit (CPU) as 32 Kbytes of memory divided into 2048 blocks of 16 bytes each. One block is designated for each address. All functions associated with a given peripheral appear in the 16 byte block assigned to the peripheral.

The call processor unit (CPU) is a bus-oriented microprocessor complex. Typically the CPU consists of a service unit, multiple microprocessors, dual port DRAMs, and a disk subsystem. More specifically, a dual port DRAM is associated with each microprocessor and operates to store code loaded from disk and supply instructions to the associated processor. Further, the service unit provides clocks and priority resolver for the bus, cross-coupled state register and interrupts for active/standby and switch-over control, the interface to the telephony controller unit, and the signaling packet transfer (SPT) function for data communication with the peripherals.

As explained previously, the telephony bus tree consists of a set of buses forming a multiplexing tree between the peripheral devices and the common control. In the exemplary integrated switch network, with 1920 peripheral devices, there are 60 buses each assigned to a port group of 32 ports. Since each bus operates at the standard 2.048 Mhz rate, 32 bytes of PCM data will be transmitted in a 125 μs frame divided into 32 time slots. It should be apparent that with the arrangement described each of the 1920 peripheral devices transmits a byte of PCM data during each frame interval. That is, all peripherals will be able to transmit in each frame.

Signaling information, that is digital data not constituting PCM voice information, is transmitted utilizing a 16 frame submultiplexing cycle or superframe. As is known in the art, signaling information and PCM voice information are transmitted over separate wires between a peripheral and the common control. That is, the bus to a peripheral is not a single wire, but a plurality of wires each connected to carry a different type of information. For example, a suitable bus may consist of 7 wires. Two wires are assigned to PCM data, one for PCM transmission the other for PCM reception. Two additional wires are assigned to carry signaling information, one for signaling information transmission, the other for signaling information reception. A sixth line is provided to carry clock signals, while the seventh line is the ground line. Thus, all bits of all time slots are available for PCM and data.

The above described integrated network switch works well and provides a cost effective, easily expandable switch. However, it has constraints which limit its applicabilities. For one, the design limits the distance peripheral cards are from the common control circuitry. Further, the number of ports is limited to 2048 ports.

SUMMARY OF THE INVENTION

It is therefore an object of the present invention to alleviate limitations of the conventional integrated circuit network switch and provide a switch having broader applications while retaining the advantages of and being compatible with the conventional integrated network switch.

These and other objects of the invention are accomplished as described herein after with reference to the preferred embodiments of the invention. However, it is to be understood that the description of the preferred embodiments are given as examples and are not to be construed as limiting the scope of the invention defined by the claims appended hereto.

More specifically, the improved integrated network switch of this invention maintains the advantages of the conventional switch while providing a large capacity switch capable of providing non-blocked switching of over 10,000 ports. This size expansion is realized in part by the provision of a modular structure for the time switch memory. This modular structure may consist of plural time switch memories termed herein Matrix Switching Units (MXUs), each for switching a very large number of ports. In one embodiment, 10 MXU cards are provided, each MXU switching 1024 ports. Larger MXU cards, for example cards switching 2048 ports are also possible with the MXU design of the invention.

Other features of the improved switch include universal shelf architecture, in addition to a universal timeslot structure, selectable full frame, half frame switching for increased efficiency and flexibility, a flexible switch to peripheral shelf transport interface to accommodate multiple different types and lengths of transport media including copper and optic fibers, and the provision of a packet signaling mechanism which permits aggregation of channels to produce 16, 32 and 64 Kbits/s channels.

With universal shelf architecture, the switch can be configured to simultaneously support both hex and octal telephony shelves each of varying sizes, thus allowing for flexible configuration and expansion. The hex and octal telephony shelves are connected to the common control through port group cables, each corresponding to 64 ports, or two conventional port groups of 32 ports each and unique interface units. The unique interfaces include Peripheral Shelf Link Interface Units (PSLI) situated on the peripheral cards and Peripheral Interface Units (PIU) situated on the common controller. At least one PSLI will interface with each PIU and functions to provide a single loop between multiple peripheral cards and a single Matrix Switching Unit (MXU). Additionally, these interfaces permit different types of peripheral shelves, such as octal and hex shelves, to interface with a common MXU. Further, different transport media between the peripheral shelves and the common control shelves can be used as the Peripheral Shelf Line Interface Units (PSLIs) associated with the telephony shelves and corresponding Peripheral Interface Units (PIUs) associated with the common controller facilitates this feature. Different versions of the PSLI and PIU are provided depending on the transport medium used.

Additionally, a shelf map of port groups from the input shelf descriptions is dynamically created. By creating logical data structures to support shelf groupings, the software can manage both co-located and remote shelves.

As all timeslots are made equivalent, any timeslot can be used as a peripheral, conference or tone timeslot. This feature may be facilitated by embedding the conference and time circuits on the MXU cards.

The improved integrated network switch also includes mixed mode switching. That is, full frame and half frame switching modes on a circuit by circuit basis are provided. This allows for shorter loop delays inherent in half frame switching for voice operations, while guaranteeing frame coherency for NX64 (i.e., video) connections.

Still further the integrated circuit switch of the invention provides an improved serial packet transfer system (SPT) for signaling information. The improved SPT system provides a flexible means for the transport of signaling data between telephony interface units and the common control. This improved system provides an elastic store, for example a two second elastic store, to all channels independent of bearer rate while permitting two, four, or eight 8 Kbits/s (1 Kbyte/s) channels to be aggregated together to form bearer channels of 16, 32, or 64 Kbits/s. The aggregation of the bearer channels into higher rate channels is programmable under control of a host processor.

Additionally, the invention consists of a system to uniquely and consistently identify processors on a bus which do not provide relative position information (i.e. slot number). The system allows for dynamic reallocation of a process's identification based on a consistent pattern. This allows processor boards to be removed and added to the bus without hard coded configuration and also facilitates the universal timeslot feature. Further, where multiple processors are provided, and one or more fail or are removed, the system allows for the remaining processors to compensate for the missing processors on a subsequent initialization. The unique identification of each processor allows for simple distribution of tasks between the processors.

BRIEF DESCRIPTION OF THE DRAWINGS

The above and further objects, features and advantages of the present invention will become more apparent from the following detailed description of the embodiments taken in conjunction with the accompanying drawings, wherein:

FIG. 1 illustrates cabinet and shelf assignments of a conventional integrated network switch.

FIGS. 11a and 11b diagram half-mode reading from contiguous buffers equal to two frame lengths.

FIGS. 12a and 12b diagram full-mode reading from contiguous buffers equal to two frame lengths.

FIG. 13 is a block diagram of the time switch of the present invention.

FIG. 14 is a more detailed diagram of the time switch of the present invention.

FIGS. 15a and 15b diagram the writing to and reading from elastic buffers for SPT signalling according to the teaching of the invention.

DETAILED DESCRIPTION OF THE PREFERRED EMBODIMENTS

Figure 2:
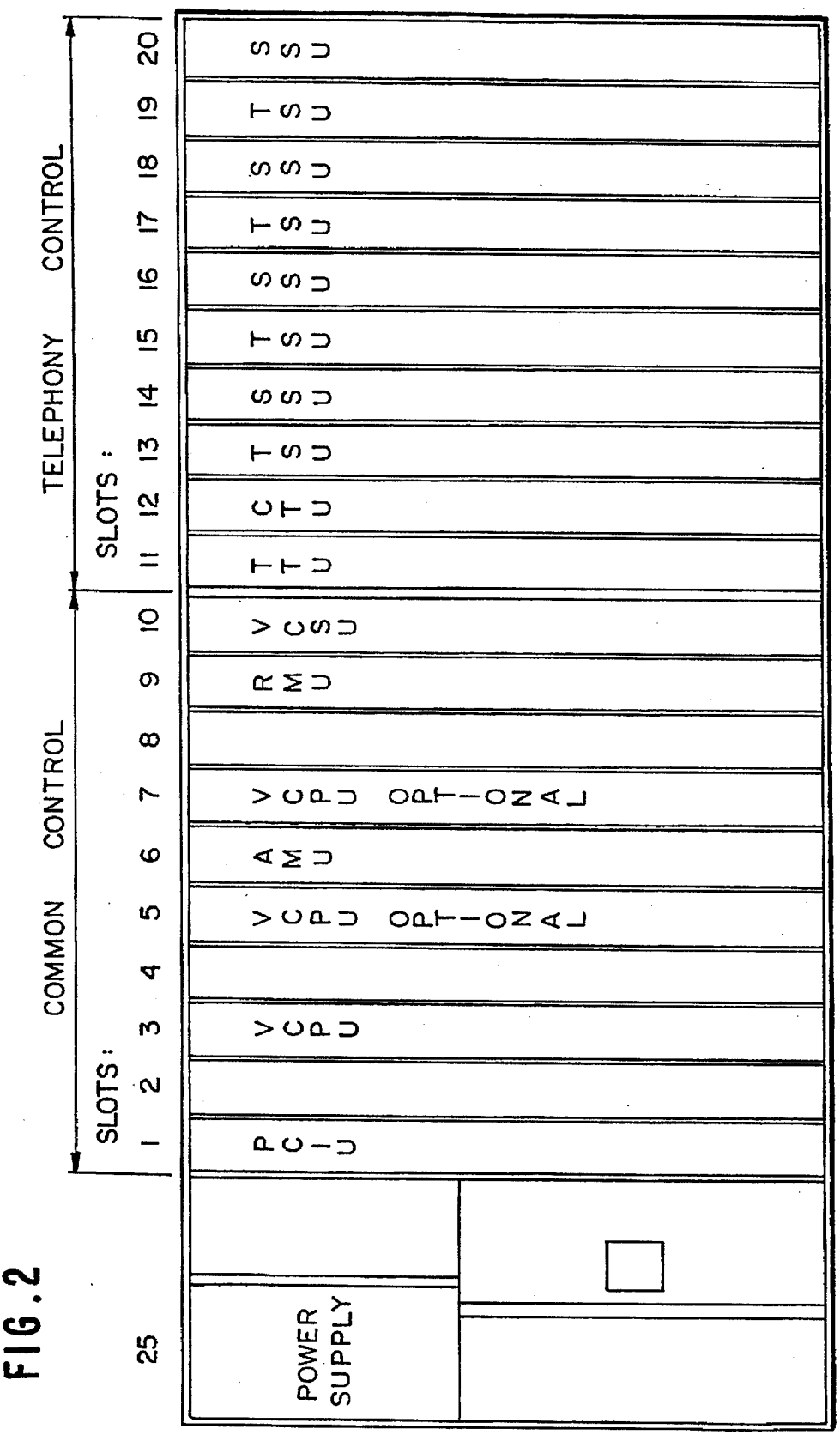
FIG. 2 illustrates slot assignments of a common equipment shelf of a conventional integrated network switch.

FIG. 1 illustrates the physical cabinet configuration of a conventional integrated network switch accommodating 1920 peripheral circuits and 128 tone/conference ports. In the illustrated embodiment the common control equipment is duplicated for redundancy reliability. That is, the common control equipment in shelves 1 and 2 of cabinet 1 are the same, with the equipment of shelf 2 being used on failure or removal of the common control equipment in shelf 1.

More specifically, the switch can be configured in a non-redundant or a redundant configuration. In the non-redundant configuration shelf 1 is occupied by common equipment. The shelf contains 20 printed circuit board card slots, a disk drive assembly that incorporates hard and floppy disk drives, and a common equipment power supply. Shelf 2 would be vacant in the non-redundant configuration.

In the redundant configuration, all elements of the common equipment are duplicated. That is, a complete set of common equipment resides in the top shelf with its mirror image located in the middle shelf. The system will run at full capacity with either set of common control equipment. Automatic switch-over occurs in the event of common control failure in the active shelf. In either the redundant or non-redundant configuration the bottom or shelf 3 is used for telephony interface units.

It is advantageous to package the peripheral, that is telephony interface circuits on cards mounted on shelves contained in suitable cabinets. In the example being discussed, it has been found suitable to mount 8 telephone circuits per card, and to provide 24 cards per shelf. Thus only 10 shelves are necessary to support 1920 circuits.

Referring now to shelf 3 of cabinet 1, it houses telephony interface circuit boards, each board usually containing 8 telephony or peripheral, as they are often termed, interfaced circuits. Each shelf can accommodate 24 boards or cards as they are sometimes termed. Therefore, each shelf will contain 24 boards each containing 8 telephony interface circuits or a total of 192 telephony interface circuits.

Nine additional physical shelves are needed to accommodate the remaining 1728 telephony interface circuits. These shelves are provided in 3 additional cabinets, three shelves per cabinet. Each cabinet also contains its own power supply.

The telephony interface circuits are connected to the common control equipment by the telephony bus tree to be described.

The telephony interface units which mount in the telephony equipment shelves contain the circuits for lines, trunk, and service units. Examples of line units compatible with the telephone interface units are (1) analog line units, (2) long-loop (off-premise) line units, and (3) digital line units.

The analog line unit is used for station service to standard rotary or tone-dial analog telephones. The long loop line unit is similar to the analog line unit. It functions for station service to rotary dial or tone dial analog telephones and also provides service to off-premise station extensions. Digital line units is used with an intelligent telephone set with data transmission and reception capabilities. The digital line unit translates internal PCM to a selected digital data signaling format that can be transmitted over standard telephone twisted pair wire for a loop distance of up to 5000 feet. The digital line unit combines 16 Kbits signaling with 64 Kbits PCM voice/data at each port. This 80 Kbit signal is transmitted to a digital loop using time compression multiplexing (TCM) technology. The TCM bursts are transmitted at 256 Kbits.

Thus, the telephony controller unit (TCU) can support two independent bytes at 500 bytes/s (i.e., 4,000 bits/s) and one 8000 bits/s serial channel in the each direction. The remaining 48000 bits/s are reserved for future use.

Examples of trunk units compatible with the telephony interface units are (1) ground start/loop start trunk units, (2) 2-wire E&M trunk units, (3) 4-wire E&M trunk units, (4) direct inward dial trunk units, (5) digital trunk units, and (6) CCITT 2.048 Mb digital trunk units.

The ground start/loop start trunk unit connects the integrated network switch directly to a central office (CO) transmitting audio information and supervisory signals between the two locations. The 2-wire E&M trunk unit and the 4-wire E&M trunk unit can both send and receive digital information in MF, DTMF, and dial pulse formats. Direct inward dial trunk units provide DID access to PBX stations from public switched networks and is capable of receiving dialing information in DTMF, MF and dial pulse formats. T1-D4 digital trunk units allow a standard 24 channel PCM trunk to interface directly to the integrated network switch. They function to convert standard T1-D4 format operating at 1.544 Mbits/s to the signaling of the switch. Each of the above identified line and trunk units are conventional and therefore a further description of the construction and operation will not be necessary for a full and complete understanding of the invention described herein. The above description is provided to provide the reader with a clear understanding of the environment in which the invention may operate.

The service units which may be used with the integrated network switch are also conventional. They may include (1) dual tone multiple frequency (DTMF) receiver units, (2) call progress detector (CPD) units, (3) broadband dial tone detector (BDTD) units, (4) multi-frequency receiver units (MFRU), (5) multi-frequency R2 receiver units (MFR2RU), (6) serial interface units (SUI), and (7) reference timing units (RTU).

The DTMF receiver receives DTMF dialing and decodes the DTMF codes into digital format. The CPD permits answer on trunk circuits that do not provide electrical answer signals. The BDTD provides tone detection for international applications. The MFRU is used for inter-office signaling, pay telephone, equal access, and special network applications. It monitors the audio channel on a particular call and translate MF codes into digital format. The MFR2RU decodes R2 international 2-of-6 frequency coding signaling. The serial interface unit (SIU) contains serial, for example, RS232C ports for system administration. The unit translates system administration information into standard internal format and sends it to the common control for processing. Information from the system is transmitted to the SIU where it is translated into standard ASCII format and transmitted out of the data ports. The SIU connects to a system peripheral interface panel where data ports are converted to RS232C signals. A terminal, printer, modem, 9 track tape or any RS232C device can be used with the SIU. The RTU, which plugs into any telephony shelf slot provides the switch with a local timing reference. It may be used as an alternate reference source for digital trunking (1.544 Mbits/s and 2.048 Mbits/s).

Conventional Common Control Equipment—Overview

The common control equipment is segmented into two subsystems; the common control subsystem or call processor unit (CPU) and the telephony control subsystem or telephony control unit (TCU).

The CPU contains the brains of the system. It contains the central processing units, called the Virtual Central Processing Unit(s) (VCPU) and associated memory units. It also contains the hard and floppy disk drives with their associated controllers and interface units.

The TCU mediates all communication between the CPU and telephony interface units/ports (i.e., lines, trunk, and service units). It continuously scans the ports for service requests and provides the mechanism for all switched PCM voice and/or signaling data connections. The TCU also includes the tone generator and conference functions, and provides timing for PCM, codecs and data. FIG. 2 illustrates details of a common equipment shelf. As above mentioned it contains 20 printed circuit board slots, the disk drive assembly, as well as a common control power supply. The disk drive is illustrated in FIG. 2 at 24 and the power supply at 25. Specially, the CPU exists in printed circuit board slots 1–10, and the TCU exists in printed circuit board slots 11–20.

Common Control Slots of Conventional Switch

Slot 1 houses the PCIU or Peripheral Controller Interface Unit. It serves as the file controller for the system's hard and floppy disk drives. It also provides a communication interface between the disk drives and the VCPU(s).

Slot 3 houses a VCPU. This is a single board computer. Either one, two or three VCPU's may be used as a function of system size and the amount of call traffic being handled. When used, the second VCPU is located in slot 5, the third VCPU in slot 7. The VCPUs in each common equipment shelf work together under the control of a multi-tasking operating system. Each VCPU contains on-board RAM memory. Additional memory may be provided in slot 6. This memory, termed Advanced Memory Unit (AMU), connects to a VCPU to provide additional RAM for additional data base storage.

Slot 9 houses the Redundant Memory Unit (RMU) for the redundant configuration. Its purpose is to insure that updates to the active data base are written to both common equipment shelves. The redundant system has at least two RMUs, one per common equipment shelf, coupled to each other through a dedicated bus. In the event of common equipment failure, the system switches automatically to the standby common equipment shelf while maintaining all calls already connected.

The Virtual C-bus Service Unit (VCSU) occupies slot 10. It provides a communication interface between the call processor unit (CPU) and the telephony control unit (TCU).

Telephony Control Slots of Conventional Switch

Slot 11 houses the Telephony Timing Unit (TTU). This unit provides system timing and synchronization. It provides the interface point to the telephony control unit hardware.

The Conference and Tone Unit (CTU) is contained in slot 12. The CTU supports a 64 port conference unit and also provides storage and generation of 64 system tones. Thus, the CTU appears as 128 ports to the TCU. A conference call may be made among as few as 3 parties and as many as 64 parties. Multiple conferences may operate simultaneous so long as the total number of ports engaged in conferencing does not exceed 64.

More specifically, the tone generator produces 64 independent continuous PCM sequences, each with its own port number. Any number of telephony devices can be connected to any tone by writing the tone's port number to the devices' source pointer. Each tone is produced by reading a selected sequence of PCM samples from an EPROM and repeating the sequence indefinitely.

The conference unit is the functional equivalent of a set of 32 analog multiport hybrids. It has 64 ports that appear to the call processor unit (CPU) as 64 independent devices. Each has its own device address, source pointer, and control register. Every port may be connected to any of the 32 hybrids in any combination. The conference unit may be configured as 32 two-input mixers, as 20 three port conferences, and so on through many variations up to one 64 input conference.

Slots 13–20 alternately contain a Time Switch Unit (TSU) and a Scan and Signal Unit (SSU). Each TSU/SSU pair supports 512 ports. Therefore, 4 TSU/SSU pairs are required for a system with 1920 peripheral ports and 128 conference/tone ports, or 2048 ports in total.

The function of a TSU is to switch pulse code modulation (PCM) voice or signaling data between as many as 512 ports. The function of the SSU is to transmit and receive signaling information to and from as many as 512 ports. As with the TSU as it is also known, each increment of 512 ports requires an additional SSU which is paired with a corresponding TSU.

Figure 3:
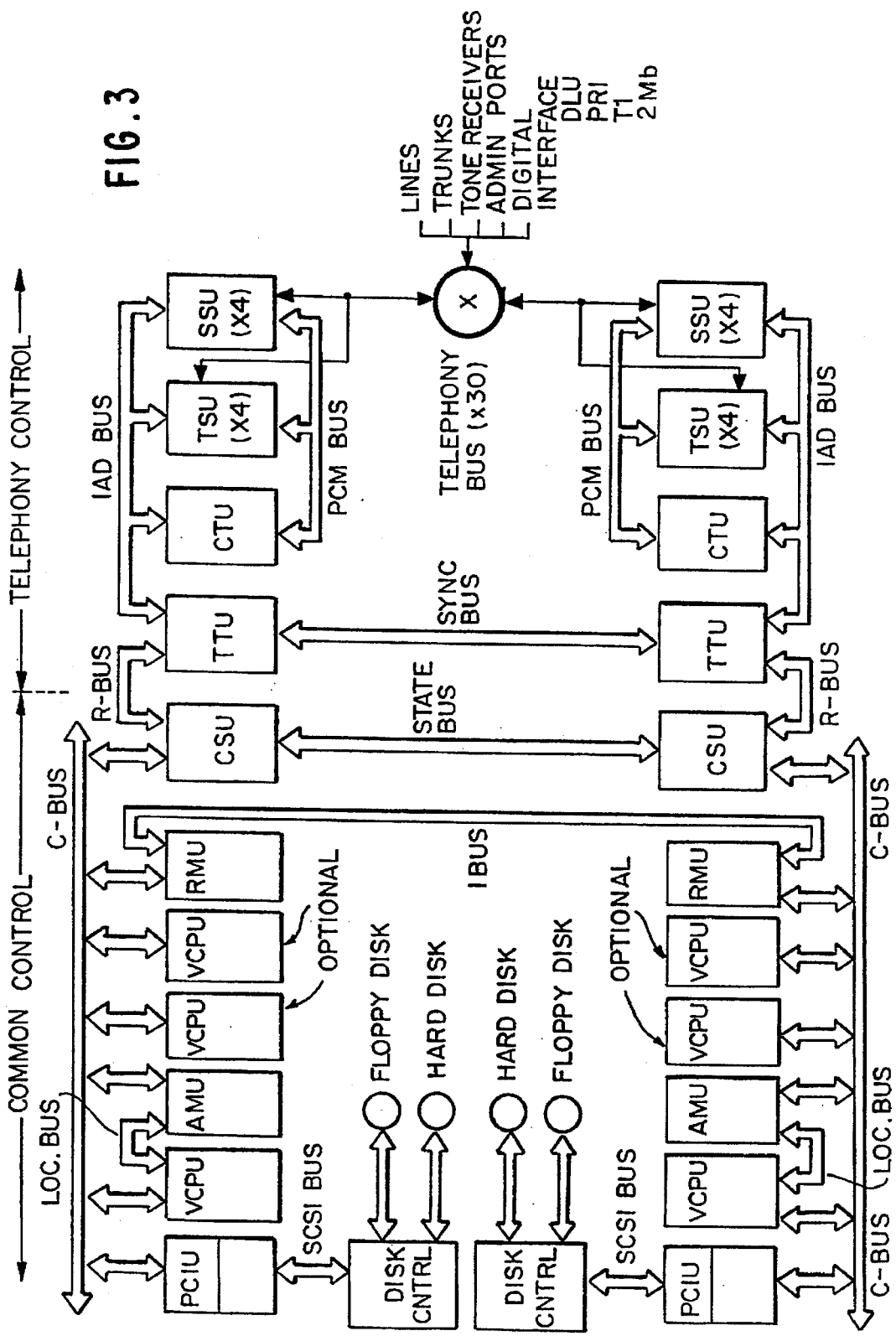
FIG. 3 illustrates the common control architecture of a conventional redundantly configured integrated network switch.

The common control architecture in a redundantly configured system is illustrated in FIG. 3. This architecture is explained in U.S. Pat. No. 4,688,212.

The Time Switch of Conventional Unit

The telephony control unit (TCU) operation provides through TSU a time switch matrix such that the time position at the input corresponds to place at the output. The time switch matrix is nonblocking so that all installed telephony devices may be engaged in conversation simultaneously and in any configuration. In other words the time switch operates as a time slot interchanger where the PCM and data characters from all ports are multiplexed together, stored in a sample memory, retrieved from it according to the contents of an address memory and then demultiplexed back to the ports.

More explicitly, the address register operates as an array of source pointer registers and is accessed by the CPU. For every connection the CPU controls the switch in each direction by writing to port number of the source to the source pointer register of the destination. In this way the sample memory need not have to be accessible by the CPU.

The 2048 port switch is implemented as a set of four modules operating in parallel, each serving 512 ports as above discussed. The four module arrangement provides convenience in construction. A sample memory and address memory is provided in each module and are run at 8.192 Mhz, 122 ns/cycle providing 1024 cycles per frame. To implement the four module construction each sample RAM is 32 bits wide so that four samples may be written to it simultaneously and one sample from each of the 2048 ports can be written in 512 cycles.

Signaling Information of Conventional Switch

The status of peripheral units are stored in a high speed RAM accessible by the call processor and maintained by the scan and signal units (SSU) discussed above. Refreshing occurs every 2 ms (i.e., once per superframe) via the telephony bus. All parts of the signaling system operate continuously at 500 Hz and every function is performed once for each port in each cycle.

Since the signaling and PCM channels use the same mechanism for multiplexing, the two directions of signaling, to and from the peripheral, each has a capacity of 64 Kbits/s per port. The submultiplexing of the superframe divides this into 16 independent functions.

The two bytes from the peripherals are divided into a device identification byte and a status byte that contains a one bit "service request" indicator that is monitored by an event scanner and 7 bits of other status. The two bytes that are sent to the peripherals are divided into one busy/free indicator bit, one bit for out-pulsing or ringing, and 14 bits of other control. A set of signaling registers is provided for every device address, including those assigned to tone and conferencing functions.

A feature of this conventional integrated network switch is the signal packet transfer (SPT) mechanism. The SPT is a 64 channel direct memory access controller with its own 32 Kbyte buffer memory. Each enabled channel will transfer 1000 bytes/s, either from a message packet in the buffer to the OUT byte, or from the IN byte to a packet in the buffer. The SPT is synchronized to the signaling multiplexer so that the sequence of bytes in the buffer corresponds exactly to the sequence of bytes received or sent by the peripheral. Each SPT channel has registers for function control, port number, buffer address, and byte count. The buffer RAM and channel control registers appear as memory on the call processor unit's bus.

Telephony Bus of Conventional Switch

The telephony bus is not a single bus but a combination of a large number of small buses constituting a multiplexing tree for multiplexing the serial signals received from the 1920 peripheral interface circuits. As mentioned previously, the peripherals are grouped into port groups of 32 peripheral (i.e., telephony) interface circuits each. Each port group is assigned a dedicated port group bus which transmits the PCM voice/data from each of 32 peripherals at 2.048 Mbits/s in a 32 time slot, 125 μsec. long frame. Each peripheral interface circuit and thus each peripheral is assigned a dedicated time slot in the frame transmitted on its dedicated port group bus.

That is, it is to be understood that the time slots of the 125 μs frame interval are not assigned to conversations as needed. Rather each time slot is dedicated to a specific telephony device, i.e., to a specific port. Therefore, each port is uniquely associated with a particular time slot carried by a particular port group bus. Further, signaling information is not sent nor received on demand of the CPU. Rather, it is continuously sent in the regular 2 ms superframe (16 125 μs frames).

Figure 4:
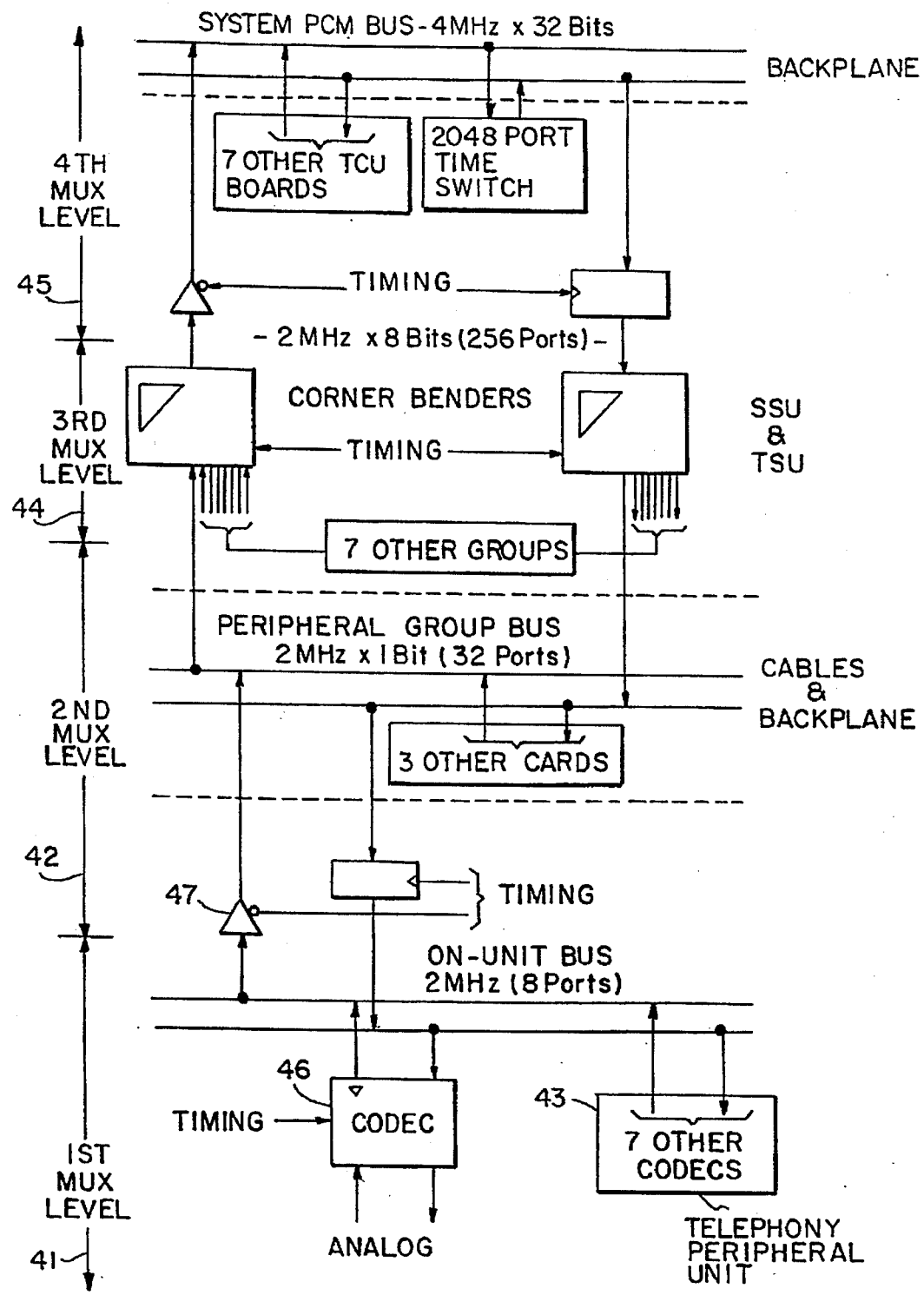
FIG. 4 illustrates the telephony bus architecture of a conventional integrated network switch.

The PCM and signalling data from all peripheral devices in the system are multiplexed together into the telephony control unit (TCU) by a fixed synchronous four level multiplexing telephony bus tree illustrated in FIG. 4. Information from the TCU to the peripheral devices is demultiplexed in an inverse symmetrical fashion. Referring to FIG. 4, the first and second levels 41,42 of the telephony bus tree are implemented on the telephony shelves carrying the peripheral interface circuit cards with telephony peripheral units 43 and together combine the PCM and signaling information from peripherals into the 2.048 Mbit/s stream of the telephony bus. The top two levels of 44,45 the multiplexing tree, that is the third and fourth levels, are implemented on the shelf carrying the telephony control unit. They operate to combine 64 port groups into one system.

In one embodiment, the first level multiplexing 41 for PCM data may be accomplished on the line and trunk units by codec chips 46. The second level multiplexing may be done at the interface of the peripheral cards to the telephony bus using tristate drivers 47. The third level multiplexing 44 combines eight serial 2.048 Mbit/s port buses into one eight bit wide 2.048 Mbyte/s stream. Thus, the third level multiplexing provides a serial to parallel conversion. Finally, the top level uses tristate drivers to produce a 4 byte wide 4.096 Mword/s internal PCM bus that feeds the CPU.

More specifically, it should be understood that the third level of the telephony bus tree performs both serial-to-parallel conversion and time multiplexing on input, and parallel-to-serial and time demultiplexing on output.

Software Support of the Hardware

The system software to support the above described hardware is divided into a mulitasking operating system and six independent subsystems. Each subsystem performs one or more tasks under the direction of the operating system. Communications between subsystems is accomplished by passing messages through the operating system. Memory space for each subsystem is disjoint since the subsystems may all run on the same processor, or may be distributed over multiple processors.

The following constitutes the major subsystems of the software: (1) initialization, (2) operating system, (3) telephony interface subsystem (TIS), (4) call-action processing subsystem (CAP), (5) maintenance processing subsystem (MAP), and (6) configuration editor subsystem.

The Improved, Increased Capacity Integrated Network Switch

The improved integrated network switch of this invention maintains all the advantages of the conventional switch while providing (1) a very large capacity switch capable of providing non-blocked switching of over 10,000 ports, (2) a universal shelf architecture along with (3) universal timeslot structure, (4) selectable full frame, half frame switching for efficient and flexible switching, (5) flexible switch to peripheral shelf transport interfaces to accommodate multiple transport media, including copper and optic fibers, (6) a packet signaling mechanism which can provide aggregated channels for 16, 32 and 64 Kbits/s signaling channels and (7) a system to uniquely and consistently identify processors on a bus which do not provide relative position information (i.e. slot number).

(1) Large Capacity Non-blocking Switching Architecture—Provides in the manner explained herein after, for a switching timeslot to exist for all peripheral timeslots simultaneously. In a preferred embodiment 10,240 timeslots are provided to accommodate over 9,000 peripheral ports. This feature is made possible by the introduction of the Matrix Switching Units (MXU) which replaces the TSU/SSU combination of the conventional switch.

(2) Universal Shelf Architecture—The improved system can simultaneously accommodate different types of peripheral shelves (e.g., octal and hex shelves) of different sizes. This feature is effected by the provision of the PSLIs on the peripheral shelves and their corresponding PIUs on the MXU shelves and the provision of dynamic shelf mapping of port groups from the input shelf descriptions. By creating logical data structures to support shelf groupings, the software can manage both co-located and remote shelves.

(3) Universal Timeslot Structure—All timeslots are made equivalent, thereby permitting any timeslot to be used as a peripheral, conference or tone timeslot. This is contrasted with the conventional system in which tone and conference addresses are dedicated to specific timeslots. In other words, the improved integrated network switch described herein eliminate the fixed mapping of the conventional switch and instead permits any tone or conference port to go to any MXU. This is accomplished by embedding the tone and conference functions on the MXU cards. As a result, no port is assigned to a tone or conference function, and therefore all ports are available as telepony ports. When a tone or conference function is needed, it is obtained from the MXU card directly, eliminating the need for a port to connect to the conventional tone generator or conference circuitry.

(4) Full-frame, Half-frame Switching—The system supports simultaneous use of both full and half frame switching. Full frame switching guarantees frame coherency for NX64 connections. Half frame switching yields minimum loop delays.

(5) Flexible Switch to Peripheral Transport—The system design permits the time switch to peripheral transport to embrace multiple forms of technologies without alteration of the baseline switch architecture. Point-to-point copper UTP interface suitable for 75 foot equipment radii may be used as well as a fiber optic loop with much expanded equipment radii. The transport is also compatible with other interfaces such as DS3/E3, OCI, and 45/50 Mbits/s ATM.

(6) Improved SPT Packet Signaling—A packet signaling channel is paired in the manner described below, with each switching timeslot. A separate input, and output 8 Kbits/s serial channel exists for every timeslot in the system. Additionally, 2, 4, or 8 channels may be aggregated together to form 16, 32, or 64 Kbits/s channels.

(7) Processor Identification—The system permits processors on a common bus which does not provide relative position information (i.e. slot number) to be identified. The system allows for dynamic reallocation of a process's identification based on a consistent pattern. This allows processor boards to be removed and added to the bus without hard coded configuration and also facilitates the universal timeslot feature. Further, where multiple processors are provided, and one or more fail or are removed, the system allows for the remaining processors to compensate for the missing processors on a subsequent initialization. The unique identification of each processor allows for simple distribution of tasks between the processors.

Increased Capacity Switch—Hardware Architecture

Figure 5:
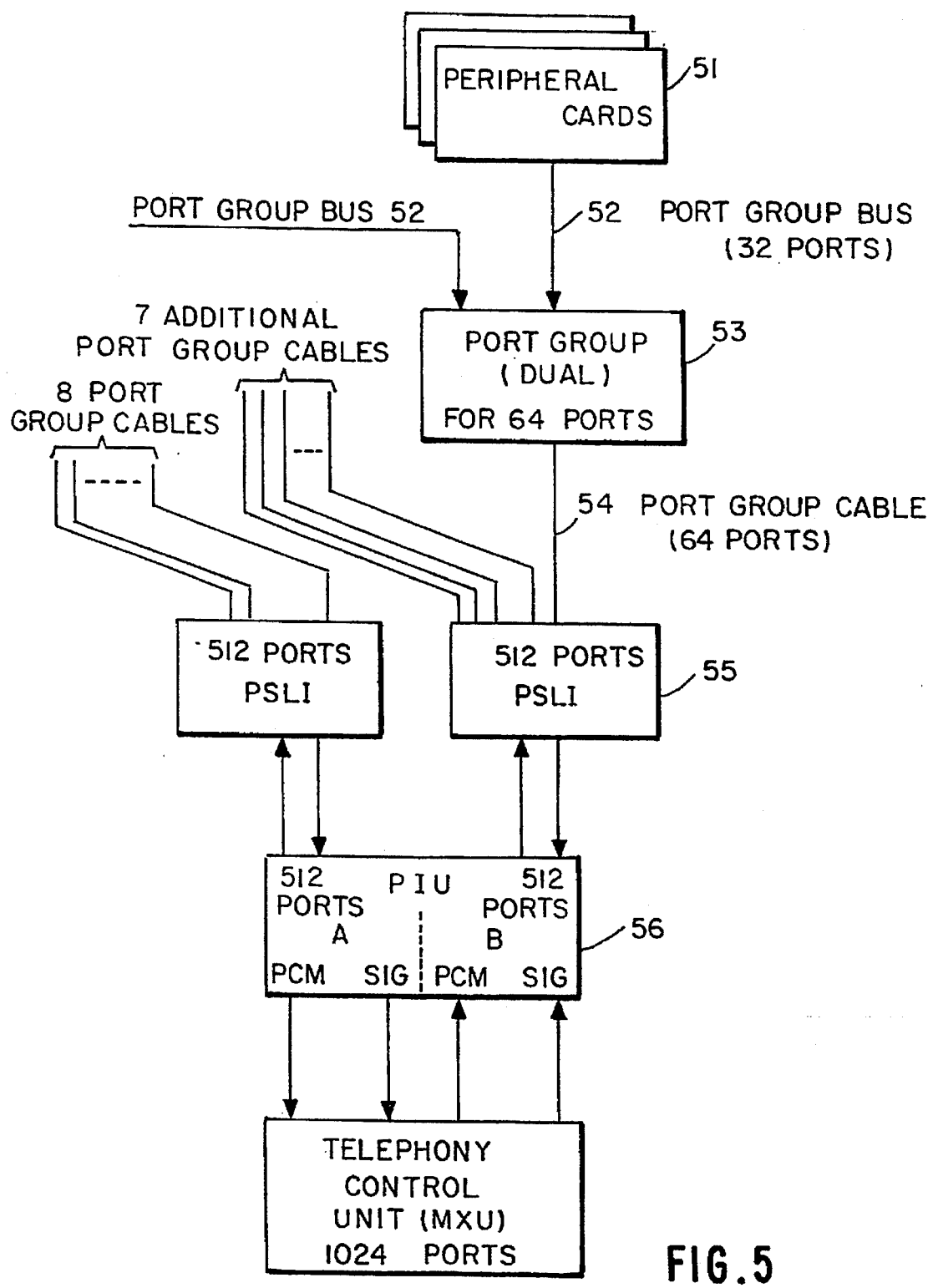
FIG. 5 is a block diagram of the integrated network switch of the invention.

FIG. 5 illustrates the block diagram of a preferred embodiment of an integrated network switch of the present invention. Like elements in FIGS. 1–4 and FIG. 5 are designated with common reference numerals. Peripheral cards 51 are connected to port group buses 52 which are combined to form port group cables 54 by etches in the peripheral backplan. Each port group cable is connected to a Peripheral Shelf Link Interface Unit (PSLI) 55 providing flexibility in the transport medium and facilitating universal shelf architecture. Each PSLI interfaces over a selected medium with a matching Peripheral Interface Unit (PIU) 56, located at the common controller. Suitable transport media include, but are not limited to, Cu UTP and fiber optic cables.

Universal Shelf Architecture

The PSLI 55 not only facilitates flexibility in the transport medium, but also provides a 64 port drop insert capability, a redundant loop capability, and full compatibility with the conventional telephony interface unit card shelves discussed above.

Figure 6:
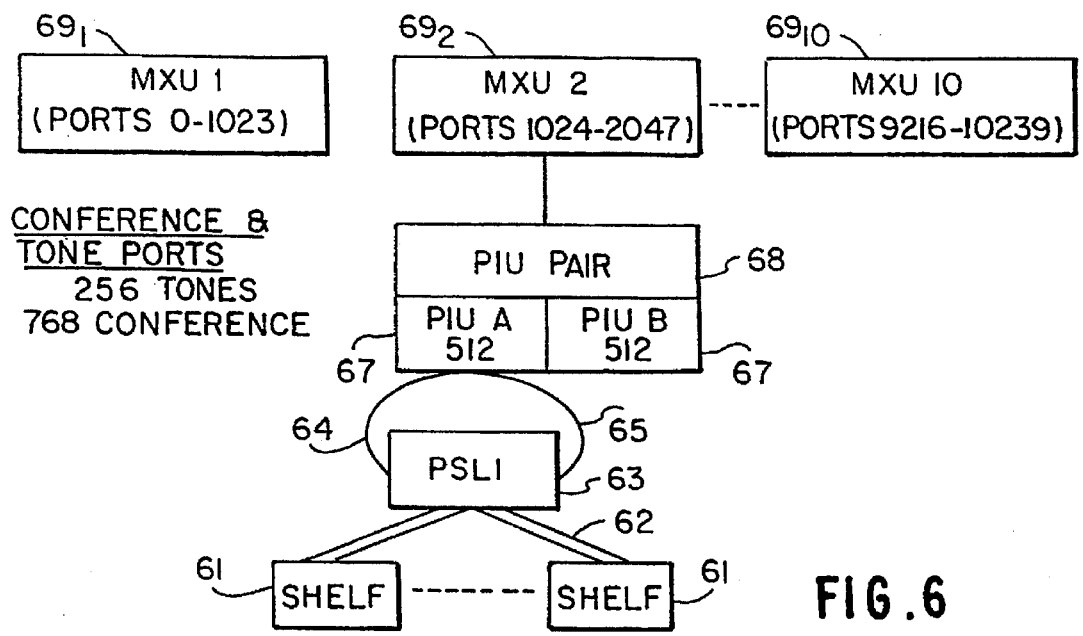
FIG. 6 illustrates one interconnection arrangement between telephony shelves and the MXUs according to the teachings of the invention.

FIG. 6 is a more detailed illustration of one configuration of the integrated network switch hardware. It is to be understood that the PSLI interfaces to the telephony shelves, with the total number of ports on a shelf being a multiple of 64. For example, the system is compatible with telephony shelves containing 192 ports (3×64), the arrangement of the conventional telephony shelf described above.

Different versions of the PSLI may be provided for different transport media. Thus, a version for copper and a version for fiber optic cable may be provided, and multiple versions can be provided in one switch. That is, the switch can accommodate multiple different transport media.

Regardless of the version, the PSLI of the embodiment disclosed herein, connects up to 512 ports to a corresponding PIU, and may reside locally on the shelves to which it is connected. One version, for example, the fiber optic version, has the added capability of selectively connecting fewer that 512 ports in 64 port increments and also possessing the capability of being located remote from the shelves with which it is connected. Fiber PSLI's may be multiplexed to a single fiber. At present up to eight fiber PSLI's may be multiplexed to one fiber optic cable.

Thus, port groupings of 64 ports each, each assigned to a cable, are designated, 8 such port groupings being assigned a common PSLI, as shown in FIG. 5. That is, each PSLI can receive 8 port group cables, each cable carrying signals for 64 ports. In other words, each port group cable of the present invention corresponds to two port group buses of the conventional switch.

Referring again to FIG. 6, assume a telephony shelf 61 containing 128 telephony interface units, on 16 cards each containing 8 telephony interface units. Each shelf would be associated with two port group cables 62 (64×2), and up to four such shelves could be associated with the PSLI 63.

The output of PSLI 63 consisting of 2 buses, a transmit bus 64 and a receive bus 65, is connected with a corresponding PIU 67. As will be explained, the PSLI converts the serial input signals at the 2 Mhz rate to 8 bit parallel signals transmitted at the 8 Mhz rate.

The PIUs may be arranged in pairs. That is, two PIUs (PIU A and PIU B) may be provided on a single board 68, each for receiving signals associated with 512 ports. Each PIU pair 68 is connected to a Matrix Switching Unit (MXU) 69, replacing the conventional Telephony Control Unit (TCU).

In one embodiment, each MXU functions for 1024 ports. In such an embodiment, ten MXUs would be provided for 10,240 ports. A first MXU $69_1$ for ports 0–1023 may be arranged for conference and tone ports. In such an embodiment there may be 256 tones and 768 conference ports. MXU $69_2$ would then accommodate ports 1024–2047, each successive MXU the next 1024 ports, with the tenth MXU $69_{10}$ accommodating ports 9216–10,239, as illustrated in FIG. 6.

The MXUs are located in the common control with each operating to dictate the switching of 1024 timeslots. With 1024 tone and conference ports, the system of this example will support 9,216 telephony ports.

Like the MXUs, the PIUs are located in the common control. As above mentioned each PIU functions as an interface between an MXU and two PSLIs. As with the PSLIs, there may be multiple versions of the PIU, based on the transport medium. Thus, there would be a copper version for systems using copper cable as the transport medium and a fiber optic version for systems using fiber optic as the transport medium. However, since pairs of PIUs (PIU A & PIU B) are mated, one to one with a corresponding MXU, a single MXU can not have both copper and fiber PIUs connected to it.

In the case where a fiber optic transport medium is used, since each PSLI can selectively service as few as 64 ports, a single PIU can have up to 8 PSLIs connected to it.

Figure 7:
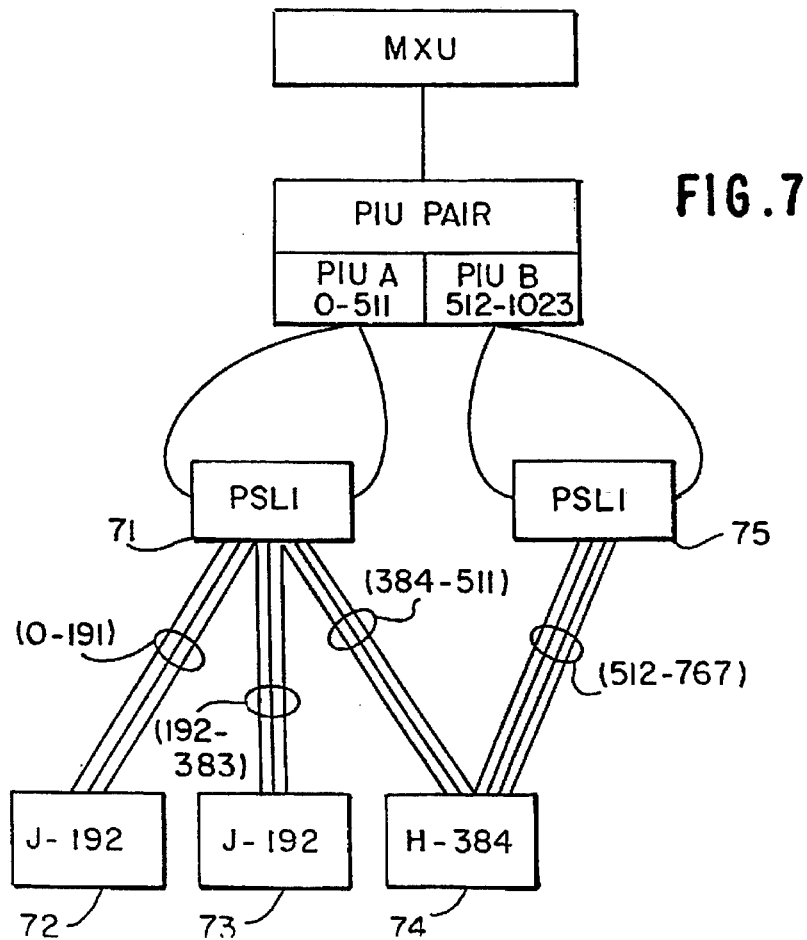
FIG. 7 illustrates another interconnection arrangement of the telephony shelves to the MXUs according to the teachings of the invention.

FIG. 7 illustrates an example of a telephony shelves/PSLI/PSI/MXU arrangement where a PSLI serves multiple, different type shelves. Specifically, PSLI 71 serves two "J" (i.e., octal) shelves 72,73 and a part of an "H" (i.e., hex) shelf 74. The balance of the "H" shelf is supported by another PSLI 75. It is to be noted that the "J" shelves can be "J" shelves operable with the conventional integrated network switch described above. Thus, each of the "J" shelves consists of 192 telephony interface units contained on 24 boards, each board carrying 8 telephony interface units. The "H" shelf contains 384 telephony interface units, that is, double the units contained on the "J" shelves.

As shown in FIG. 7 since the PSLI can accommodate only 512 ports and the two "J" shelves represent 384 ports, only 128 ports of the "H" shelf can be accepted by the PSLI 71. Therefore, the PSLI 75 will receive the remaining 256 ports of the "H" shelf 74.

The arrangement of FIG. 7 is useful when the shelves are collocated and copper PSLI-PIUs with a copper transport medium therebetween is used. However, while possible, the configuration of FIG. 7 is not efficient when using fiber optic cable, due to the cost of routing two fiber optic cables to the same remote site.

Figure 8:
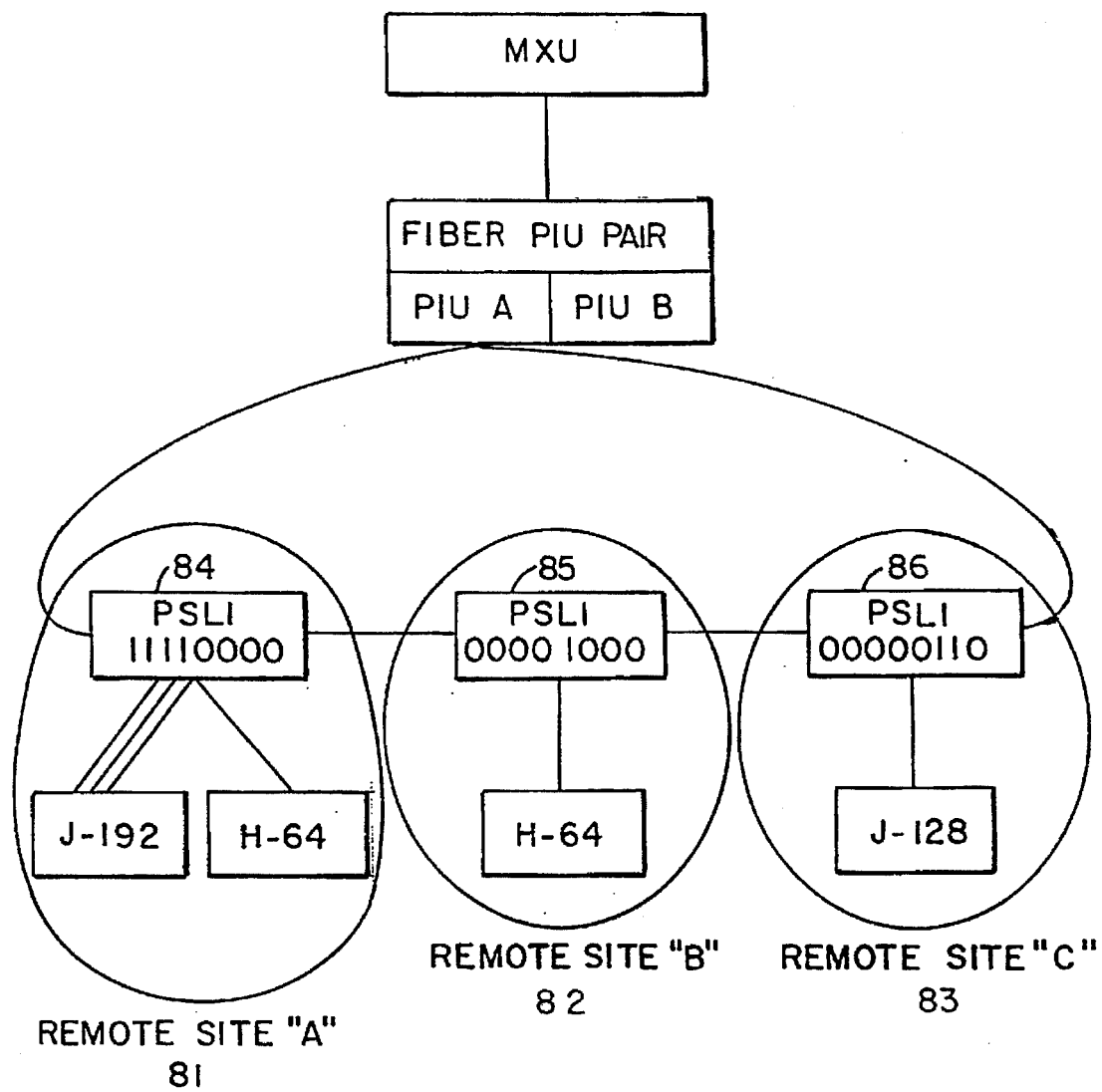
FIG. 8 illustrates a further interconnection arrangement of the telephony shelves to the MXUs according to the teachings of the invention.

FIG. 8 illustrates how the PSLI/PIU concept of the invention permits several small numbers of ports to be drop inserted at remote locations while using a single loop to the common control shelf. That is, a single loop, e.g., a single fiber loop has been distributed to 3 sites 81,82,83 remote from the common control using 3 PSLIs 84,85,86. This is made possible because each PSLI can selectively filter which ports it supports on a loop through bit switches on the card.

More specifically, for the arrangement being described, there are provided 8 bit switches (not shown) on the PSLI card which allow the PSLI to filter down to a resolution of 64 ports on 64 port boundaries. In FIG. 8, a first PSLI at remote site A, 81, is using the first 4 port group cables, each corresponding to 64 ports to support a "J" shelf and part of an "H" shelf. Thus the PSLI 84 is configured to only filter out timeslot information for the first four port cables (i.e., timeslots 0-255) by having the first four bit switches set to "1". The second PSLI 85 at remote location B, 82, is using only one port group cable to support an "H" shelf with only 64 ports active on the shelf. A single bit switch in the fifth position filters out timeslots 256-319 for the 64 ports active at remote site B.

A third PSLI 86 at remote site C supports 128 ports and therefore two 64 channel port group cables are needed.

Therefore bit switch positions 6 and 7 are set to "1" to filter out the 128 timeslots between 320-447.

It is to be noted that 64 additional ports can be accommodated. Since the PSLIs do not have to filter contiguous ports, the unallocated ports can be later assigned to any of the remote sites A–C or to an additional remote site. For example, if an additional 64 port shelf were later added to site A, the shelf could be connected to the PSLI already associated with the site, and the last, that is the 8th, bit switch would be set to "1" to support that added shelf.

The PSLI—Detailed Description

Figure 9:
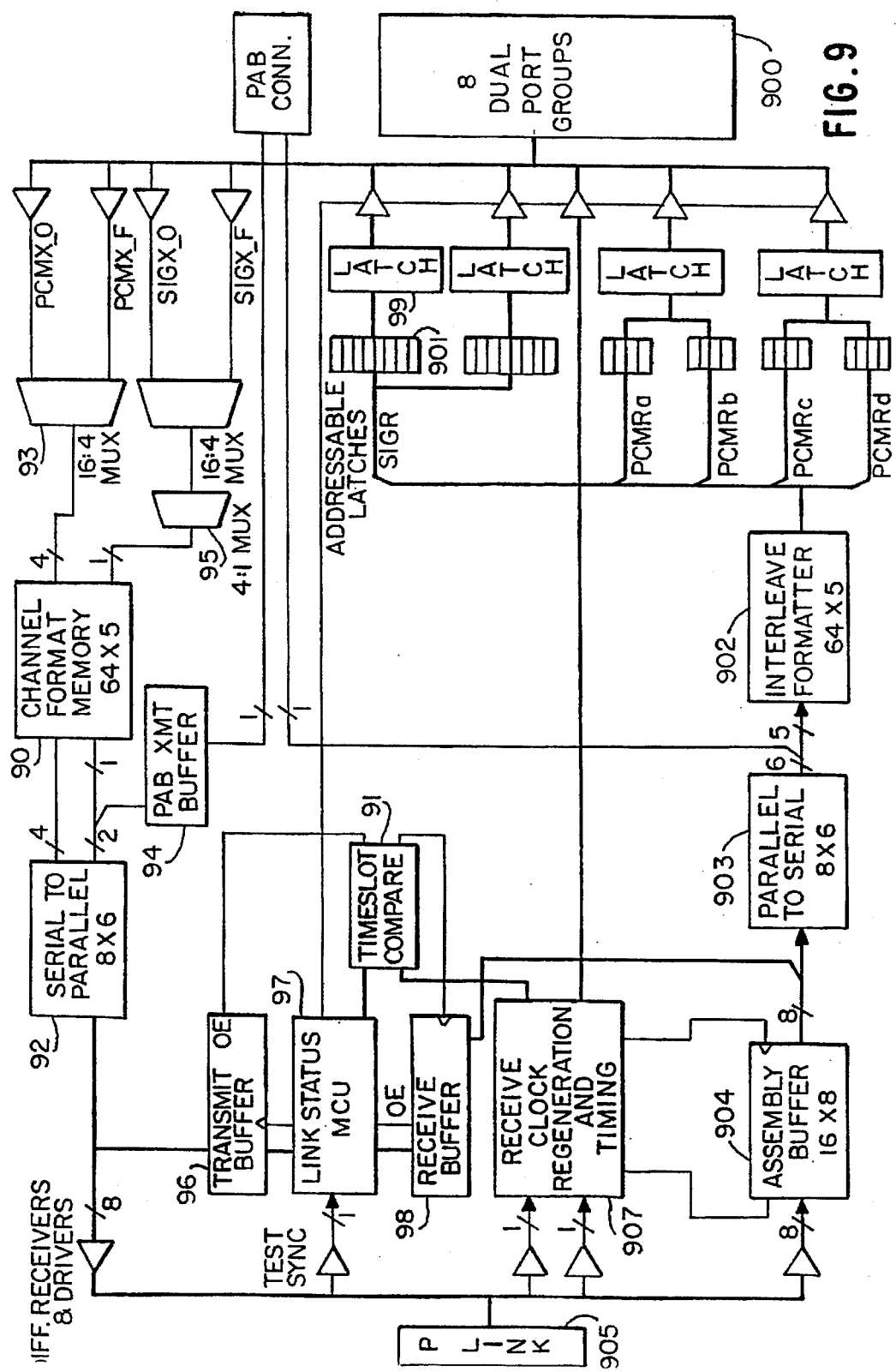
FIG. 9 illustrates a block diagram of a PLSI.

A block diagram of a PSLI for copper transport medium is illustrated in FIG. 9. The PSLI for fiber transport medium is similar. A difference is that the PLSI circuitry interfaces with fiber optic links rather than copper links. A similar distinction is found between PIUs for copper links and PIUs for fiber optics. The PSLI mounts in existing racks. External connections include 8 Port Group Buffer interfaces 900 (with either redundant or non-redundant port group buffer cabling), 1 Power and Alarm interface, a 25 pair cable high speed link 905 to the PIU, a debug connector and a power supply connect. Two PSLI cards connect to a single PIU through the 25 twisted-pair peripheral link cable 905 (P-Link). Each P-Link cable carries PCM and signaling information for 512 peripheral ports. Additionally, a P-Link transports link maintenance and cabinet Power and Alarm (PAB) overhead data. All high speed signals are differential and balanced.

PSLIs are arranged in a point-to-point topology. Each PSLI transports 512 ports of full duplex PCM and Signaling between eight port group interfaces and its associated PIU card. A single PIU interfaces with two PSLIs for a total of 1024 ports. Due to the 1 to 4 ratio of active signaling channels to active PCM channel and the 1 to 16 ratio of active overhead channels to active PCM channel, the active slots needed to transport 512 PCM slots are 672 out of 1024 total slots per Peripheral link in each direction.

The PSLI recovers timeslot and signaling information from the P-Link to which it interfaces. The data recovery section performs peripheral receive clock recovery, peripheral receive data recovery, and peripheral receive data frame/superframe recovery. The receive path information is placed in an elastic buffer. The data recovery section uses recovered superframe data to locate the beginning of the buffer.

Each P-Link interface includes eight transmit and eight receive pairs. The 16 pairs of wires provide hi-directional balanced transport for 512 peripheral port data and signaling channels. Additionally, Clock, Superframe sync (SSFX), and Test Sync signal pairs, and single-ended ohmic connections are bi-directional.

Data on the P-Link bus is sampled on the rising edge of the PH1 clock. Data to the P-Link bus is updated on the falling edge of the PH1 clock. Maximum tolerable data skew between the on-line, and off-line shelves is ±50 ns.

On P-Link A, PCM is present on even 8.912 Mhz clock cycles, with reference to SSFX, and signaling, overhead, and unused bytes appear on odd cycles. For P-Link B, PCM is present on odd clock cycles, with reference to SSFX, and signaling, overhead, and unused bytes appear on even cycles.

Receive Channel

Basic receive synchronization is provided by PSLI clock recovery logic 907. The P-Link byte clock is transported by the link and recovered to the 8.912 Mhz basic system clock by way of a phase locked loop. In addition, 16 independent MODE signals, one for each port group, are generated from the P-Link transported superframe sync (SSFX).

The assembly buffer 904 collects byte parallel data and acts as an elastic store buffer. This buffer's write pointer is controlled by the recovered byte clock. The read pointer is synchronous with the recovered peripheral clock. Overhead bytes specific to link maintenance are read from the buffer output data stream.

The PSLI diagnostic/control microcontroller accesses P-Link received byte streams through a timed data buffer 98. The microcontroller loads a timeslot address register which is compared with the timeslot counter. This mechanism controls writes to the buffer from P-Link timeslots. Buffer reads are under direct microcontroller control.

The microcontroller had read/write access to "spare" overhead bandwidth for communication with the PIU microcontroller. Read access of receive data in "live" PCM and signaling, and PAB data timeslots is provided for diagnostic data monitoring functions.

The telephony peripheral bus side of each PSLI is driven from a master PLL recovered clock. The PLL locks to the 8.192 Mhz. byte clock, and Superframe sync signal (SSFX) of the P-Link.

After a switch over, the phase of SSFX and PSLI telephony sync can be misaligned. This may occur when the redundant links have different path lengths. The PLL will correct phase alignment of SSFX and PSLI telephony sync with no more than 10 ppm frequency deviation from the byte clock. Differential cable length will be limited to 10 feet resulting in a maximum time differential of 15 Ns. Realignment is guaranteed to occur less than 1 second after a switch over.

The PLL output drives a telephony peripheral bus counter with generates CLOCK, SYNC, FRAME, MODE AND OH (overhead) timing for each port group.

Data from the receive assembly buffer 904 feeds six latched input shift registers 903; four PCM, one signaling, and one overhead/PAB. Each PCM and signaling shift register sources a single bit line of the receive interleave formatter. Output from the overhead/PAB register drives the PAB output directly.

The receive interleave formatter 902 converts 4 PCM octets and 1 signaling octet, into five separate bit interleaved links. This 5 bit memory is 64 bits effective depths; two pages, 32 bit each.

Interleaved PCM from the four PCM receive interleave formatter lines is de-multiplexed into sixteen addressable latches 901, one for each PCMR bus. Data from the one signaling data line is de-multiplexed to sixteen addressable latches, one for each SIGR bus.

Transmit Channel

PCM data from the sixteen PCMX 90 lines source four each, 4:1 multiplexers 93. These multiplexers feed the Channel Format Memory 90. The sixteen signaling lines multiplex through two layers 93, 95 of 4:1 multiplexers to compress the stream. The first multiplexer layer 93 combines for 2.048 Mhz streams into a single 8.912 Mhz path. The second layer 95 eliminates transport of the twelve unused signaling frames. The resulting line inputs to the Channel Format Memory 90.

Data from the transmit PCM and signaling multiplexers sources five lines of the Channel Format Memory. Every byte clock, 4 bits of PCM and 1 bit of signaling from 4 ports are written into the Channel Format Memory. This is repeated 32 times for every four ports for a total of 256 accesses per frame. The buffer acts as five 64 bit serial memories. Bit interleaved data input, is read out as byte interleaved data. Eight consecutive reads from 8 different location are required to construct a byte to the transmit serial-to-parallel converters 92. A total of 1024 reads are required every frame.

The MODE signal is shifted by one frame for each port group. This results in an even interleave of signaling information at the MXU.

The transmit serial to parallel converters 92 consist of latched output shift registers, sourced by the transmit Channel Format Memory. Parallel data is then written to the appropriate locations of the transmit assembly buffer.

The PSLI diagnostic/control microcontroller 97 access P-Link transmit streams through a timed data buffer 96. As in the receive path, the microcontroller loads a timeslot address register which is compared with the timeslot counter at 91. This mechanism controls reads from the buffer to the P-Link timeslot. Buffer writes are under direct microcontroller control.

The microcontroller had read/write to "spare" overhead bandwidth for communication with the PIU microcontroller. Read access of receive data in "live" PCM and signaling, and PAB data timeslots is provided for diagnostic data monitoring functions.

The data sequence is based on a 2 ms superframe. Each superframe contains 16 PCM byte samples and 4 signaling byte for each of 512 ports in the peripheral link. Additionally, 1×512 overhead bytes are transported in a superframe. This is broken down in to 16 125 µs frames which contain 512 single PCM byte samples, one per port, 128 signaling bytes, and 32 overhead bytes. The frame is further divided into 32 timeslot blocks of 32 bytes each. These blocks contain 16 PCM byte samples, 4 signaling bytes, one overhead byte, and 11 unused bytes. The timing is arranged such that every other byte contains PCM samples.

The PSLI interfaces to the peripheral shelf through up to eight Port Group Buffers. Port Group Buffer cables connect to 20 pin 0.1" spacing, dual row, ribbon cable connectors.

The PIU—Detailed Description

Figure 10:
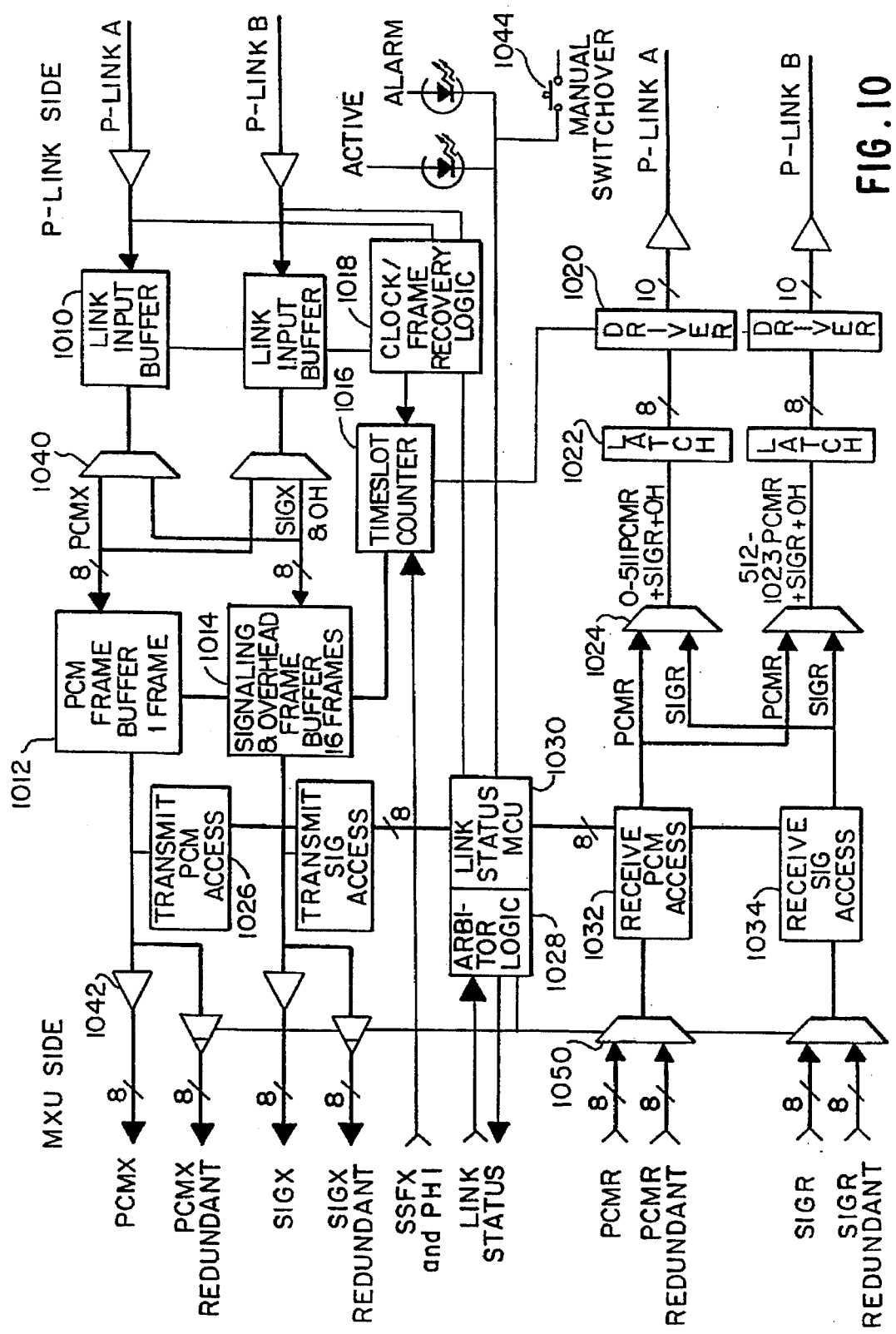
FIG. 10 illustrates a block diagram of a PIU.

A block diagram of a PIU for copper transport medium is illustrated in FIG. 10. The PIU for copper twisted pair transport medium will now be explained.

The PIU conforms to the mechanical height specifications as a single slot Telephony Controller Bus (TCB) assembly. It inserts from the back side of the card cage into any one of ten PIU card slots. It has two 160 pin DIN backplane connectors, and two 50 pin high speed peripheral link (P-Link) connectors.

The PIU receives 1024 PCM byte samples from the MXU every frame and distributes 512 of these samples via Peripheral Link A (P-Link A) to PSLI A and the other 512 samples via Peripheral Link B to PSLI B. The PIU also receives 1024 sports of signaling and overhead data from the MXU every superframe, interleaved with the PCM sample onto P-Link A and P-Link B. Overhead data includes Power Alarm Board (PAB) cabinet control/status information, as well as P-Link maintenance and a communication channel to the PIU microcontroller. Signaling transfer on each P-Link is such that when PCM is seen at the P-Link A interface, signaling and link data is seen at the P-Link B interface and vice versa. In addition, the PIU provides a symmetric PCM/Signaling crossover path with the other PIU in the redundant telephony controller shelf.

The PIU transfers 1024 PCM byte samples every frame of the MXU. PSLI A and PSLI B each provide 512 of the 1024

PCM samples. PCM from both PSLIs is presented to the MXU on a single, byte wide path for distribution on the Telephony Controller's PCM Highway. The PIU also transfers 1024 ports of signaling and overhead data to the MXU each superframe. PSLI A interleaves the signaling and overhead data for ports 0–511 with the PCM byte samples and PSLI B provides it for ports 512–1023. The MXU makes signaling and overhead accessible over the TC Bus. Data/clock recovery, data buffering and a symmetric PCM/Signaling crossover path with the redundant shelf is built into the backplane interface.

The PIU recovers timeslot and signaling information from the P-Link to which it interfaces. The data recovery section performs peripheral transmit clock recovery, peripheral transmit data recovery, and peripheral transmit data frame/superframe recovery. The transmit path information is placed in an elastic buffer. The data recovery section uses recovered superframe data to locate the beginning of the buffer. PIUs interface locally to an MXU card.

Each P-Link interface includes eight transmit and eight receive pairs. The 16 pairs of wires provide bi-directional balanced transport 512 peripheral port data and signaling channels. Additionally, Clock, Superframe sync (SSFX), and Test Sign signal pairs, and single-ended ohmic connections are bi-directional.

Data on the P-Link bus is sampled on the rising edge of the PH1 clock supplied by a BTU through the MXU. Data to the P-Link bus is updated on the falling edge of the PH1 clock. Maximum tolerable data skew between the on-line, and off-line shelves is ±50 ns.

On P-Link A, PCM is present on even 8.192 Mhz clock cycles, with reference to SSFX, and signaling, overhead, and unused bytes appear on odd cycles. For P-Link B, PCM is present on odd clock cycles, with reference to SSFX, and signaling, overhead, and unused bytes appear on even cycles.

Output PCM and signaling is received from the MXU for each of the peripheral PCM timeslot ports, 0–1023; PCM appears on PCMRCV, signaling on SIGRCV. The PIU directs PCM and signaling for timeslots 0–511 to P-Link A; PCM and signaling for 512–1023 to P-Link B.

PCM and signaling/overhead data from the MXU is received on four separate byte-wide data paths; once PCMRCV and one SIGRCV from the MXU on the same shelf, one PCMRCV and one SIGRCV from the MXU on the redundant shelf. Data is timed from the Telephony Controller clock PH1 and is framed by the synchronous superframe signal, SSFX. All data is sampled on the rising edge of PH1 clock.

In a redundant system configuration, the PIU is capable of receiving PCM and signaling data form one of two MXUs on redundant Telephony Controller shelves through a crossover data path. This path is embedded in the Telephony Controller backplane and is driven by open collector logic. Both PIUSs pass receive data from the active shelf toward redundant PSLIs. All four transmit data. P-Links, both A and B from both active and standby shelves, are enabled. Of the two redundant PIUs, only one set of transmit drivers is active. Of the two redundant pairs of PSLIs, only one pair of receive drivers is active. The active set is selected by PIU/PSLI arbitration logic.

Receive PCM and signaling/overhead paths are multiplexed by multiplexers 1024 onto two P-Link paths. Each resulting path contains Pcm samples, signaling, and overhead associated with 512 peripheral ports and their transport P-Link. P-Link A contains data for ports 0–511; P-Link B transports port 512–1023 data.

The PIU diagnostic/control microcontroller accesses each P-Link receive byte streams through two independently controlled data buffers. The microcontroller has read/write access to overhead bandwidth for communication with a Common Control via a TC Bus, the PIU microcontroller can also communicate with the microcontrollers at each PSLI. Read access of receive data in "live" PCM and signaling timeslots is provided for diagnostic data monitoring functions.

Receive data for each P-Link may be latched by latches 1022 and driven over IEEE 488 type balanced differential drivers 1020. Driver power supplies are AC isolated from Telephony Controller shelf power to reduce EMI emissions.

Transmit Pcm signaling data from the two peripheral interfaces, P-Link A and P-Link B, is multiplexed onto the PCMXMT and SIGXMT busses. The PIU receives PCM and signaling for timeslots 0–511 from P-Link A; PCM and signaling for 512–1023 from P-Link B. PCMXMT and SIGXMT drivers for the MXU on the same shelf are always enabled. PCMXMT and SIGXMT drivers for the redundant crossover bus are enabled only on the active PIU.

Each P-Link is connected to a small, eight clock, link synchronization buffer 1010. These buffers serve to time align P-Link data for an error of up to four clocks between links. The time corrected PCM and signaling data from each link is separated by type in a demultiplexer 1040 and recombined to form one 1024 port per frame Pcm stream and one 1024 port per superframe signaling and overhead stream.

The PIU diagnostic/control microcontroller accesses each P-Link transmit byte streams through two independently controlled data buffers. The microcontroller has read/write access to overhead bandwidth for communication with the Common Control via the TC Bus, as well as microcontrollers at each PSLI. Read access of receive data in "live" PCM and signaling timeslots is provided for diagnostic data monitoring functions.

Thus, transmit PCM and signaling/overhead data from each of the two P-Links pats is de-multiplexed onto two paths. One path contains 1024 PCM samples per frame from both P-Links, the other; signaling, and overhead associated with 512 peripheral ports and their transport P-Link.

The PIU can perform two frame synchronization buffer functions 1012, 1014; one for transmit PCM and a second for transmit signaling and overhead. The Pcm sync buffer 1012 is one frame deep. The signaling sync buffer 1014 is one superframe in depth. The buffers, combined with the link synchronization buffers, compensate for any peripheral shelf loop propagation delays.

The frame sync buffer input pointer (peripheral transmit interface side) is resynchronized by superframe synchronization which is recovered from the peripheral link using the clock/frame recovery lock 1018 and timeslot counter 1016. The output pointer is locked to system timing derived from an MXU-generated SSFX superframe sync signal.

The active PIU drives crossover connections to the MXU on the redundant crossover PCMX and SIGX paths at a time, but concurrent access may occur without damage to either PIU. Each PIU drives its own PCMXMT and SIGXMT path to its local MXU. The PIU incorporates crossover bus enable logic. The active PIU enables open collector drivers that drive both PCMXMT and SIGNXMT onto the redundant crossover bus.

Separate PCM and signaling/overhead data paths are presented in byte wide format from the Frame Synchronization memories on each PIU to its MXU. Also the active PIU drives the shared/redundant crossover bus to the MXU in the redundant shelf. All data is updated on the rising edge of PH2 clock, the Telephony Controller 8.912 Mhz clock.

A redundant peripheral link consists of two PIUs and four PSLIs. Arbitration logic 1028 resident on each PIU selects which P-Link pair is actively driving the Port Group interfaces. Common Control equipment activates one of the two PIUs.

A pair of embedded microcontrollers, resident on the PIU and PSLI, perform dynamic signal analysis to verify the integrity of each P-Link. In addition, ohmic connections detect unplugged cables. In the redundant configuration, the PSLI resident microcontrollers communicate an arbitration protocol over the PSLI Arbitration Control channel. The redundant arrangement is such that failure of a link can be routed around the faulty media, or peripheral shelf line interface, through the PIU in a redundant chassis. PIUs are independently redundant. Failure of a PIU does not dictate a shelf switchover to maintain operation.

The PIU on the active Telephony. Control shelf always has priority in link activity. A link switchover will occur for any of three reasons; a link failure on either P-Link connected to the PIU, a manual push button link switchover request at the PIU or one of its PSLIs, or a software generated link switchover request. After a link switchover, the inactive PIU on the active Telephony Control shelf will return to active on the next error to valid transition or push button request.

The microcontroller, by way of a latch, inserts a test byte into a predetermined outgoing overhead timeslot on each P-Link. The corresponding PSLI on each link returns the byte in the same timeslot on the return path. At the PIU transmit interface, a latch captures the test byte for comparison. The microcontroller informs the Common control of link status through the TCB Bus.

The PIU may contain LED indicators; two for common PIU functions; and one for each of two P-Links. Mounted on the user accessible edge of the card, these LEDs indicate status of each PIU and P-Link for maintenance operations such as PIU or P-Link cable replacement.

| Description | Color | Function |
|---|---|---|
| PIU Power | Green | Confirms that the PIU is powered |
| PIU active | Green | Indicates this PIU is actively communicating over both P-Links to PSLIs. Mounted near the P-Link connectors. |
| P-Link A failure | Red | Indicates an error on P-Link A. In a redundant configuration, such an error causes a PIU switchover. Generates an alarm to the Common Control. Mounted near the P-Link A connector |
| P-Link B failure | Red | Indicates an error on P-Link B. In a redundant configuration, such an error causes a PIU switchover. Generates an alarm to the Common Control. Mounted near the P-Link A connector |

A user accessible P-Link disable control may be provided. This push button switch 1044 posts a link disable request to the PIU microcontroller 1030. If a redundant link is available, this request will cause a controlled, or "soft" link switchover. The success of a P-Link disable request can be verified by the indication of the link status LEDs. After a switchover has taken place, the inactive PIU will be in a "wait for valid" state. In this state, the PIU will remain off-line until its operating state changes, which may happen for example if a P-Link is disconnected, and then returns to a valid operating mode. A debounce timer will not allow an exit from the "wait for valid" until a predetermined time.

The system software has access to one Link Control byte for each PIU. PIU Link Control functions affect all connected PSLIs. The Link Control register allows the software to generate a switchover request and force a PIU/PSLI microcontroller reset.

MXU Interface

PCMXMT: peripheral port PCM to the MXU

SIGXMT: peripheral port signaling, and link data to the MXU

Redundant PCMXMT: peripheral port PCM to both MXUs

Redundant SIGXMT: peripheral port signaling, and link data to both MXUs

PCMRCV: MXU PCM to peripheral ports

SIGRCV: MXU signaling, and link data to peripheral shelves

Redundant PCMRCV: MXU PCM to both PIUs & data to peripheral shelves

Redundant SIGRCV: MXU signaling to both PIUs & data to peripheral shelves

Arbitration bus: Communications between the two PIUs

PH1: Telephony Controller clock 8.912 Mhz

P-Link Interface

The P-Link consists of 50 wires arranged as 25 pairs. The pairs are assigned as follows:

| | |
|---|---|
| 1–8 | RCV Data |
| 9 | RCV 8.192 Mhz Clk |
| 10 | RCV Frame Sync |
| 11–18 | XMT Data |
| 19 | XMT 8.192 Mhz Clk |
| 20 | XMT Frame Sync |
| 21 | RCV Test Slot Sync |
| 22 | XMT Test Slot Sync |
| 23 | Ohmic Link Continuity |
| 24 | Signal Ground |
| 25 | Frame Ground |

Signaling Memory

Each PSLI transports four bytes of signaling information to the PIU, and four bytes from the PIU, for each of the 512 P-Link ports on every superframe. A total of 1024 ports of full-duplex signaling is combined at each PIU.

All signaling to and from the PIU is stored in the MXU. The MXU reformats the signaling data for presentation to a BTU/VSU which further translates apparent data locations.

Shelf Mapping to Facilitate Universal Shelf Architecture

A feature of the integrated network switch disclosed herein is the flexible shelf map arrangement. The shelf map is the logical representation of what type of telephony shelves are included with a switch in addition to how the telephony shelves are connected to the switch. Unlike the conventional integrated network switch where the shelf map is fixed and determined at the factory, the system herein described permits the user to configure the shelf map.

While some telephone switches offer a "universal port architecture" in which an peripheral slot will support multiple types of peripheral cards, the integrated circuit network switch associated herein introduces a new concept which allows the switch administrator can configure a "universal shelf architecture". This means that the administrator can configure his switch to support multiple types of hex and octal telephony shelves, thus allowing for flexible configuration and expansion. The design supports all type of hex and octal telephony shelves (even those not yet conceived) which are connected to the common control through port group cables.

The algorithms and data structures used to describe the telephony shelf map allow the administrator to configure the location and type of connectivity (fiber for remote shelves and copper for co-located shelves) for each shelf. In addition, the number of ports that will be supported may also be configured. This capability allows customers to partition telephony ports among the shelves in multiples of 64 ports (the number of ports in a single cable).

The value of this invention is its level of flexibility and allowance for future growth. Customers can install a 192-port shelf and configure anywhere from 64 ports to 192 ports on that shelf. If a customer chooses to leave some slots on the shelf unconfigured (for example, at a remote site), he can. By not forcing a full configuration, this software allows the user to route his remaining physical ports to other shelves in his system. This architecture will also allow the customer to add additional ports to his shelves at a later time.

The flexible configuration is accomplished by dynamically creating a map of port groups from the input shelf descriptions. By creating logical data structures to support shelf groupings, the software can manage both co-located and remote shelves.

The shelf map is the logical representation of what type of telephony shelves are includes with a switch in addition to how the telephony shelves are connected to the switch.

The following requirements were considered in designing the new shelf map:

The continued shelf configuration must continue to be supported for conventional peripheral cards such as in the "M", "L" and "19" Rack switches. All types of shelves must be supported by the switch. This includes shelves used by the "M", "L" and "19" Rack shelves. Drop/Add of shelves must be supported. This allows the customer to remote shelves and specify that only a few or all ports are to be assigned on each shelf (in 64 port increments).

The new shelf map must ultimately be configurable by the user. This is necessary to allow the customer to move the location of shelf independently. The eventual introduction of the 2048 timeslot MXU (and other common control hardware enhancements such as DS3 and ATM cards) must not impact the basic shelf map design. The capability of configuring a single MXU as mixed tone, conference and telephony ports must be allowed for.

The following assumptions were made when designing the new shelf map:

The shelf map is closely tied to the physical hardware of the switch. Therefore, the way shelves are managed for the "M", "L" and "19" Rack switches is not being changed. The shelf map for the switch is not purchasable. This is necessary to allow for the customer to configure shelf locations "on-the-fly". Instead, the customer purchases some number of Matrix Switching (MXU) cards per common control shelf. The total number of ports on a shelf is always some multiple 64. Shelf numbers are limited to 99. This allows for extreme flexibility for specifying remote shelves without changing the current sh-sl-ci (shelf-slot-circuit) format.

It is necessary to understand the possible hardware setups of the improved switch in order to understand what flexibility is necessary in the shelf map. The hardware which the shelf map is most concerned about includes the MXU, Peripheral Interface Unit (PIU) and Peripheral Shelf Line Interface (PSLI) cards. An example of an MXU/PIU/PSLI arrangement is shown in FIG. 5 discussed above.

MXUs are located in the common control with each dictating the switching of 1,024 timeslots. There maybe 10 MXUs in the switch. If desired, the first MXU configured entirely for conference and tone port usage, although this is not necessary. The remaining 9 MXUs would be used for telephony switching, yielding 9,216 maximum telephone ports in the switch.

Directly connected to each MXU are two PIUs, each at which services 512 timeslots. PIUs are located in the common control, functioning as an interface between the MXU and one or more PSLIs. Pairs of PIUs are constructed as one card, so PIU cards are mated one-to-one with MXU cards. At present, PIUs come in copper and fiber. The copper version is used to connect to PSLIs which are local to the common control shelves while the fiber version is used to connect to PSLIs located far away from the common control shelves. Since pairs of PIUs are mated one-to-one with MXUs, a single MXU cannot have both copper and fiber PIUs connected to it.

The PSLI interfaces between the PIU and the telephony shelves themselves. Like the PIU, PSLIs have both copper and fiber versions, but they always reside locally on the shelves to which they are connected. Both the copper and fiber versions of a single PSLI have the capability of connecting all 512 ports that they service to telephony shelves, but the fiber version has the additional capability of selectively servicing fewer than 512 ports in 64 port increments (on 64 port boundaries) as shown in FIG. 6 discussed above. Since each PIU supports 512 ports and each fiber PSLI can selectively service as few as 64 ports, a single PIU can have up to 8 PSLIs connected to it (512/64=8).

From the point of view of a configuration editor, the MXU-PIU-PSLI combination is similar to the Telephony Switching Unit/Secondary Switching Unit (TSU/SSU) pairs used with the conventional switch. Like the TSU/SSUs, shelves on the inventive switch are allowed to be serviced to multiple PSLIs.

As shown in FIG. 7, discussed above, the first PSLI is supporting two "J" shelves and part of an "H" shelf. The rest of the "H" shelf is being supported by a second PSLI. This configuration would be typical for shelves which are co-located with the common control using copper PIU-PSLIs. Such a configuration using fiber PIU-PSLIs is possible but impractical due to the cost of routing two fiber cables to the same remote site.

Another, but not only additional configuration possible involves a single fiber loop which has several small numbers of ports "dropped" at remote locations, as shown in FIG. 8. Note that in FIG. 8, a single fiber loop is distributed to 3 sites using 3 PSLIs. This is possible because each fiber PSLI can selectively filter which ports it supports on a loop through bit switches on the card. There are 8-bit switches on the PSLI which allow the PSLI to filter down to a resolution of 64 ports on 64 port boundaries. In FIG. 8, the first PSLI at site "A" is using the first 64-port port cables to support a "J" shelf and a partial "H" shelf. The PSLI is configured to only filter out timeslot information for the first 4 port cables by having the first 4-bit switches on. The second PSLI at site "B" is using only one port cable to support its "H" shelf with only 64 ports active on the shelf. A single bit switch gives it all the ports it needs. The third PSLI at site "C" needs 2 port cables to support its 128-port "J". Note that none of the PSLIs has the last bit switch on—these ports are unallocated and can be used later at any of the remote sites or on another PSLI at another site. Also note that the PSLIs do not have to filter contiguous parts. For instance, if a 64-port "J" were added later to site "A", the shelf could be connected to the PSLI already at that site and the last bit switch would be turned on to support the shelf.

The editor can view all of the shelf configurations all in the same way. The editor considers shelves which are co-located to be in Shelf Groups. If the editor knows which shelves are co-located, it can allow a single shelf to span PIU boundaries without concern that a shelf assigned after this shelf may need to be at a remote site. To make configuration easier, two types of shelf groups are defined: copper shelf groups and fiber shelf groups. How shelf groups are managed is defined below based on the following rules which apply to shelf groups:

Shelf groups must begin on even PIU boundaries.

Fiber and copper PIUs cannot be in the same shelf groups (shelf groups in homogeneous).

Shelf numbers 1 and 2 may be reserved for the common control shelves.

The first part configuring the shelf map is to specify whether the MXUs are connected to fiber PIUs or copper PIUs. The user must do some planning ahead of how many shelves will be local to the common control area and how many will be remote. The user specifies MXU type in Table I above.

Note that MXU 1 in this example is predefined as the conference and tone unit. The user must configure at least one MXU before shelf group configuration can continue. The editor will later use this information to assign shelves to the appropriate MXUs.

TABLE I

| SHELF MAP . . . ? mxu | |
| --- | --- |
| SHEFL-MXU . . . ? list | |
| MXU Number (1–10) | [ALL/LONG]. . . ? |
| MXU Number . . . . . . . . | 1 |
| MXU Type . . . . . . . . . . | 1K Tone and Conference Unit |
| Comment . . . . . . . . . . . | PRE-DEFINE |
| MXU Number . . . . . . . . | 2 |
| MXU Type . . . . . . . . . . | 1K Telephony |
| PIU Pair Type . . . . . | COPPER |
| Comment . . . . . . . . . . . | |
| MXU Number . . . . . . . . | 3 |
| MXU Type . . . . . . . . . . | 1K Telephony |
| PIU Pair Type . . . . . | COPPER |
| Comment . . . . . . . . . . . | |
| MXU Number . . . . . . . . | 4 |
| MXU Type . . . . . . . . . . | 1K Telephony |
| PIU Pair Type . . . . . | COPPER |
| Comment . . . . . . . . . . . | |
| MXU Number . . . . . . . . | 5 |
| MXU Type . . . . . . . . . . | 1K Tone and Conference Unit |
| Comment . . . . . . . . . . . | PRE-DEFINE |
| MXU Number . . . . . . . . | 6 |
| MXU Type . . . . . . . . . . | 1K Telephony |
| PIU Pair Type . . . . . | COPPER |
| Comment . . . . . . . . . . . | |
| MXU Number . . . . . . . . | 7 |
| MXU Type . . . . . . . . . . | 1K Telephony |
| PIU Pair Type . . . . . | COPPER |
| Comment . . . . . . . . . . . | |
| MXU Number . . . . . . . . | 8 |
| MXU Type . . . . . . . . . . | 1K Telephony |
| PIU Pair Type . . . . . | COPPER |
| Comment . . . . . . . . . . . | |

TABLE I-continued

| MXU Number . . . . . . . . | 9 |
| --- | --- |
| MXU Type . . . . . . . . . . | 1K Telephony |
| PIU Pair Type . . . . . | COPPER |
| Comment . . . . . . . . . . . | |
| MXU Number . . . . . . . . | 10 |
| MXU Type . . . . . . . . . . | 1K Telephony |
| PIU Pair Type . . . . . | COPPER |
| Comment . . . . . . . . . . . | |
| SHELF-MXU . . . ? exi | |
| SHELF-MAP . . . ? group | |
| SHELF-GROUP . . . ? list | |

The copper shelf group encompasses all shelves which are co-located with the common control. Using FIG. 17 as an example, assume that that shelf configuration is to be added as a copper shelf group. Assume the user has already added the MXU information as in the previous section.

First, the user adds the shelf group:

```
SHELF . . . ? add 1
TYPE . . . . ? copper
    Command . . . ? add
    Shelf Type . . . ? J
    Number of Ports (64–192) . . . ? 192
    Command . . . ? add
    Shelf Type . . . ? J
    Number of Ports (64–192) . . . ? 192
    Command . . . ? add
    Shelf Type . . . ? H
    Number of Ports (64–384) . . . ? 384
    Command . . . ? END
COMMENT . . . ? Shelf group for local shelves
SHELF . . . ? list 1
Shelf Group Number . . . . . . . . . . . . . . . . . . . . 1
Shelf Group Type . . . . . . . . . . . . . . . . . . . . . Copper
```

| Shelf | Type | MXU-PIU | SLOTS | # PORTS | PORT RANGE |
| --- | --- | --- | --- | --- | --- |
| 03 | J | 02-A | 01-24 | 192 | 01024–01215 |
| 04 | J | 02-A | 01-24 | 192 | 01216–01407 |
| 05 | H | 02-A | 01-08 | 128 | 01408–01535 |
|  |  | 02-B | 09-24 | 256 | 01536–01791 |
| — | — | 02-B | — | 256 | 01792–02047 |

Comment . . . Shelf Group for local shelves

What the above illustrates is that after the user entered the information for the first shelf, the editor found that shelf 3 was unallocated and assigned #3 as the shelf number (note the editor determines shelf number assignment). Next, the editor found it had not copper PIUs already assigned to this group. Using the MXU configuration data, the editor allocated the first free copper PIU (on MXU 2, PIU A) and assigned the new shelf to it. Like shelf numbers, the editor determines which MXU and PIU a shelf will be assigned to. Once the second shelf information was entered, the editor found it could assign that shelf as shelf #4 and that the PIU already in the shelf group could support the shelf. When the third shelf was assigned, the editor found it could assign the shelf as shelf #5, but that only 128 ports could be assigned to the PIU already in the group. The editor found another free copper PIU from the MXU configuration data and completed the shelf assignment.

Each fiber shelf group encompasses all shelves which are either co-located at a specific site or are wired to the same fiber loop. There is no reason for the editor to know when a fiber loop has been dropped at several sites (this will become more apparent in the next example). Using FIG. 8 as an example, assume that the shelf configuration is to be added to the fiber shelf group. Assume the user has already added the appropriate MXU configuration information.

First, the user adds the shelf group:

```
SHELF . . . ? add 2
TYPE . . . . ? fiber
      Command . . . ? add
      Shelf Type . . . ? J
      Number of Ports (64-192) . . . ? 192
      Command . . . ? add
      Shelf Type . . . ? H
      Number of Ports (64-192) . . . ? 64
      Command . . . ? add
      Shelf Type . . . ? H
      Number of Ports (64-384) . . . ? 64
      Command . . . ? add
      Shelf Type . . . ? J
      Number of Ports (64-384) . . . ? 128
      Command . . . ? END
COMMENT . . . ? Shelf group for remote sites A, B & C.
SHELF . . . ? list 2
Shelf Group Number . . . . . . . . . . . . . . . . . . 2
Shelf Group Type . . . . . . . . . . . . . . . . . . . . Fiber
```

| Shelf | Type | MXU-PIU | SLOTS | # PORTS | PORT RANGE | PSLI Bits |
|-------|------|---------|-------|---------|------------|-----------|
| 06 | J | 03-A | 01-24 | 192 | 02048–02239 | 1111xxxx |
| 07 | H | 03-A | 01-04 | 064 | 02240–02303 | xxxx1xxx |
| 08 | H | 03-A | 01-04 | 064 | 02304–02367 | xxxxx1xx |
| 09 | J | 03-A | 01-16 | 128 | 02368–02495 | xxxxxx1x |
| — | — | 03-A | — | 064 | 02496–02623 | |

Comment . . . Shelf Group for remote sites A, B & C.

Note that the configuration of the fiber shelf group was just like the configuration of the copper shelf group. The difference is that the editor knew what type of PIUs to select (fiber) and the editor also specified the PSLI bits which must be turned on so the use would know which shelves went with which PSLI. The editor does not really know or care how the use has physically arranged the shelves.

Many other ways of arranging the same fiber shelf group can be conceived. To allow for maximum flexibility, the editor does not limit the user in how the hardware is arranged. With the knowledge of shelf numbers and PSLI bits, the user has enough information to wire shelves as needed.

Table 2 illustrates another shelf mapping configuration. It is to be noted that since the shelf group 5 is fiber configuration searches for the first available fiber MXU-PIU. In this example it is assumed that MXU-PIUs 1–5 are copper interfaces. Therefore, shelf group 5 can not be assigned to any of them. MXU-PIU 6 is assumed to be a fiber interface. Thus, shelf 5 is assigned to this MXU-PIU. Shelves 6–8 are also fiber connected. They are assigned to MXU-PIU 6 to the extend of its capacity. Thereafter, the next fibers MXU-PIU is located. In this example, it is MXU-PIU 9. Therefore, slots 5–24 of fiber shelf 8 is assigned to MXU-PIU 9-A.

TABLE 2

Shelf Group Number . . . . . 1
Shelf Group Type . . . . . . . Copper

| Shelf | Type | MXU-PIU | Slots | # Ports | Port Cables |
|-------|------|---------|-------|---------|-------------|
| 1 | H | 2-A | 01-24 | 384 | 1,2,3,4,5,6 |

Group Comment . . . .
Shelf Group Number . . . . . 2
Shelf Group Type . . . . . . . Copper

| Shelf | Type | MXU-PIU | Slots | # Ports | Port Cables |
|-------|------|---------|-------|---------|-------------|
| 2 | H | 2-B | 01-16 | 256 | 1,2,3,4 |

Group Comment . . . . Piu-B
Shelf Group Number . . . . . 3
Shelf Group Type . . . . . . . Copper

| Shelf | Type | MXU-PIU | Slots | # Ports | Port Cables |
|-------|------|---------|-------|---------|-------------|
| 1 | H | 3-A | 01-24 | 384 | 1,2,3,4,5,6 |

Group Comment . . . . New MXU
Shelf Group Number . . . . . 4
Shelf Group Type . . . . . . . Copper

| Shelf | Type | MXU-PIU | Slots | # Ports | Port Cables |
|-------|------|---------|-------|---------|-------------|
| 4 | H | 3-B | 01-16 | 256 | 1,2,3,4 |

Group Comment . . . . Try to use PIU B . . . .
Shelf Group Number . . . . . 5
Shelf Group Type . . . . . . . Fiber

| Shelf | Type | MXU-PIU | Slots | # Ports | Port Cables |
|-------|------|---------|-------|---------|-------------|
| 5 | H | 6-A | 01-24 | 384 | 1,2,3,4,5,6 |
| 6 | H | 6-A | 01-08 | 128 | 7,8 |
|   |   | 6-B | 09-24 | 256 | 1,2,3,4 |
| 7 | O | 6-B | 01-24 | 192 | 5,6,7 |
| 8 | H | 6-B | 01-04 | 64 | 8 |
|   |   | 9-A | 05-24 | 320 | 1,2,3,4,5 |

Group Comment . . . . Fiber shelf group
SHELF-GROUP . . . ? exi

A file, MXU.LIB stores the configuration data entered by the user which defines each MXU and its associated PIU type. There is one record per MXU possible. The data stored is as shown below:

| | MXU Type (1 byte) | PIU Pair Type (1 byte) | MXU Bits (8 bits) | Comment (64 bytes) |
|---|---|---|---|---|
| 01 | 0 = undefined<br>1 = CTU<br>2 = Telephony | 0 = undefined<br>1 = Copper<br>2 = Fiber | (see below) | |
| 02 | | | | |
| ... | ... | ... | ... | ... |
| 10 | | | | |

The MXU Bits field is defined as below:

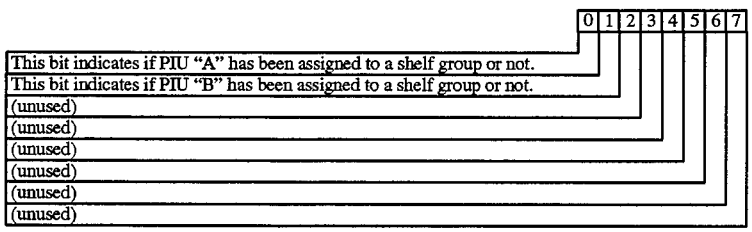

The MXU.LIB file is an editor-only file (call processing does not read it). When the shelf map is applied to a database, this file is copied to a file MXU.DBx (where "x" is the database selected). Although this file is not used during the editing of a specific database, copying this file to the database when the shelf map is applied to the database leaves a way of restoring the master copy of this file if the master copy gets destroyed. The maximum size of this file is 670 bytes.

A file, SHELF.LIB stores the shelf group information entered by the user. Like the MXU.LIB file, this file is an editor-only file. The header of this file has one record for each shelf group.

|    | Shelf Group Type (1 byte) | Shelf Record # (1 byte) | Number of Shelves In Group (1 byte) | Comment (64 bytes) |
|----|---------------------------|-------------------------|-------------------------------------|--------------------|
| 01 | 0 = undefined<br>1 = Copper<br>2 = Fiber | Record number of first shelf record in this shelf group. | This number is used to determine how many shelf records there are. | |
| 02 | | | | |
| ... | ... | ... | ... | ... |
| 20 | | | | |

Since each shelf group must start on an even PIU boundary and there are a maximum of 20 PIUs in a switch with 10 MXUs, there is a maximum of 20 possible shelf groups.

The rest of the file consists of specific shelf information in the following form:

|    | Type | MXU | PIU | Start Slot | # Slots | Start Plot | # Plots | PSLI Bits |
|----|------|-----|-----|------------|---------|------------|---------|-----------|
| 01 | | | | | | | | |
| 02 | | | | | | | | |
| 99 | | | | | | | | |

Array of 8

The fields are defined as:
Type (byte): This field indicates the type of shelf which is configured for this shelf number. A shelf type of 0 indicates a shelf is not assigned.
The rest of the fields are in an array of 8. This is because in the worst case, a shelf can be supported by up to 8 non-contiguous 64-port connectors.
MXU (byte): This field indicates the MXU where the shelf resides (2–10).
PIU (byte): This field indicates the PIU on the MXU where this shelf resides (0="A", 1="B").
Start Slot (byte): This field indicates the first slot number this MXU-PIU combination is supporting.
Slots (byte): This field indicates the number of slots on this shelf (starting at the start slot number) that are contiguously supported by MXU-PIU.
Start Port (word): This field indicates the first port number which is supporting the first port of the starting slot.
Ports (word): This field indicates the number of ports which are contiguously supported on this shelf on this MXU-PIU.
PSLI Bits (byte): This field indicates which bits must active on the PSLI this shelf is connected to.

The port group structures of the conventional switch are sufficient to support the improved switch without modification (except to increase the size of the arrays). The port group structures allow the editor to map a logical SH-SL-CI designation to its physical port. There are 5 main structures, know as pg_shelf, pg-first_slot, pg_backplane_type, pg_slot and plain old slot.

The first three structures have one array element per port group in a switch. Each port group has 32 ports in it, therefore, there are 320 port groups in the improved switch (10240/32=320). Note that the first 32 port groups exist on MXU 1. These port groups are not terribly useful to the editor when MXU 1 is assigned conference and tone ports. That leaves 288 port groups for the telephony ports.

pg_shelf

For each port group, the pg_shelf structure records what shelf number the port group resides on. For the old "L" switch the shelf number could only reach a value of 12, but for the improved switch described herein, this value can reach 99.

pg_first_slot

For each port group, the pg_first_slot structure records what slot number the first port in this port group supports. The improved switch has the same slot number ranges as the "M", "L", and "19" Rack switches.

pg_backplane_type For each port group, the pg_backplane_type structure records what type of backplane (shelf type) this port group resides on. The improved switch supports all types of shelves produced for the "M", "U" and "19" Rack switches.

pg_slot

The pg_slot array contains one element for each possible slot in a switch. Its sizing assumes the worst case possibility of every slot being an octal slot (10240/8=1280). The slots are in port group order, so in the worst case of octal shelves there are four slots allowed for each port group (32/8=4). For each slot, it records whether the slot is available and, if not, what type of board is configured in the slot. This information is appropriate for the switch since the switch supports the same telephony hardware as the conventional switches described herein before.

slot

The slot array contains one element for every possible slot in a switch, even if the slots reside in shelf which is not supported by purchased hardware. For instance, the "L" switch has a maximum of 12 shelves with 24 slots in it (12×24=288). But, if you multiply 288 slots times 8 ports per slot, you get 2304 ports. This number is high because a fully populated "L" switch does not use all slots in a 4 cabinet switch.

In the slot structure, slot information is arranged in shelf order (24 slots for shelf 1, 24 slots for shelf 2, etc.). For each slot, the port group number where the slot resides on is stored. This array must be expanded to support up to 99 shelves for the improved switch, but otherwise remains unchanged.

The shelf map may reserve shelves 1 and 2 for common control. In a non-redundant switch, shelf 1 would be the common control and shelf 3 would be the first telephony shelf. This leaves room for an eventual upgrade to a redundant switch, where shelves 1 and 2 would be the redundant common control shelves and shelf 3 would still be the first telephony itself.

New shelf configurations applied and saved in a database require a double simultaneous reboot. This is in line with what happens on existing switches when a new shelf map is upgraded.

Full-frame Or Half-frame Switching

The increased capacity integrated network switch may operate in either full-frame or half-frame switching modes on a circuit by circuit basis. This permits the switch to take advantage of the shorter loop delays inherent in half-frame switching while at the same time guaranteeing frame coherency for connections needing full frame switching, such as N×64 (video) connections.

Half-frame switching is a switching mechanism where the average input to output delay is one half of a frame. Switching delay varies from zero to one frame, depending on the connection.

Full frame switching is a mechanism where the average input to output delay is one and one-half complete frames. Switching delay varies from one frame to two frames depending on the connection.

The increased capacity integrated network described herein takes advantage of each switching methodology. Thus, voice connections and the like are normally made using half-frame connections, while NX64 connections and the like are normally made using full-frame connections. Full-frame or half-frame operation is controlled on a per connection basis by a defined default condition of a designated bit position in a connection control register word. The default condition is initialized by the hardware. That is to say, since the peripheral controls whether the full-frame or the half-frame operation is necessary, upon connection of the peripheral to the system the default condition is set, determined by the peripheral description.

Half-frame switching will now be discussed in greater detail. Referring to FIGS. 11A and 11B, where the arrow designates the write pointer and the shaded area the read hemisphere, it should be apparent that in a half-frame configuration, sample PCM data is available to the switch output as soon as it arrives. In effect, the half-frame mode treats the information memory as though there is only one buffer space of storage, meaning storage space for only a single byte per port. Thus, when as shown in FIG. 11A the write pointer is in the A hemisphere at memory location A-0700, reading is going on in the address space constituting the hemisphere between memory locations B-0700 and A-0699, representing a frame wide buffer. In other words, the reading proceeds in the last 1024 bytes stored in an MXU backward from the current write pointer position. In the example of FIG. 11B when the address pointer is in the B hemisphere at B-0300 the reading operation is in the hemisphere from A-0300 to B-0299.

On the other hand, in the case of full-frame switching, there is a zero to one frame delay from the time a given sample arrives at the switch to the time it is available to the output of the switch. This is indicated by the gap between the write pointer and the read hemisphere leading edge as shown in FIGS. 12A and 12B. Thus, when, as shown in FIG. 12A, the address pointer is for example at A-0700, reading will only occur in the opposite hemisphere, meaning in the memory space storing the information received in the previous frame, namely in the address space constituting B-0000 to B-1023. That is, the reading will not begin until a full frame of PCM data has been received. Similarly, in the example of FIG. 12B, with the address pointer in the frame constituting the B-hemisphere, reading will not begin until the frame is completely written into memory, and thus reading begins in the previous frame designated as addresses A-0000 to A-1023.

The conventional switch uses only half-frame or full-frame configurations. In the conventional switch above described, only half-frame switching is used. This configuration does provide short delay characteristics, and compensates transport and processing delays with a skew between the information memory inputs and the connection memory outputs. However, it suffers the disadvantage that it can not provide a broad base capability.

To accomplish the broad base capability, the mixed mode operation above described is implemented. To provide the NX64 and other capabilities which require full-frame operation, the integrated network switch described herein has a two frame capacity. That is, there are two dedicated storage locations, each a frame in length, for the PCM data from each port.

Since the buffer store is capable of storing two samples per port source, rather than one sample per port source as in a half-frame only system, it is necessary to identify which stored sample is to be read based on whether half-frame or full-frame operation is selected, which in turn is based on the peripheral being read. Therefore the following rule has been devised.

The source address is defined as the source of the information to be read. The write pointer is the location in memory being written into. The most significant bit of an address designates the hemisphere, that is, the first or second frame of the two frame buffer; namely, whether the address is in the memory space of the first 1024 bytes (one frame length) or that of the second 1024 bytes (also one frame length). In other words, addresses 0000000000–0111111111 represent the first 1024 memory locations, 0 through 1023. Address 100000000 represents memory location 1024 and the beginning of the second frame length buffer. Thus to flip between the first and second frame length buffers, one need only change the MSB. Therefore, when the source address is less than the write pointer, the most recent sample in the current write hemisphere can be read. To read the sample in the opposite hemisphere from that being written into, one need only change the MSB of the source pointer.

Since the memory buffer is designed to store two frames and thus two samples per source address, when half-frame operation is selected it is necessary to select the proper, that is the most recently received sample which corresponds to the source address in the write hemisphere. To assure this operation the integrated network switch is constructed to operate in accordance with the following rule.

When operating in the half-frame mode, the current value of the most significant bit (MSB) of the write pointer is used as the source address (that is the source pointer is selected from the write hemisphere) when and only when the source address without the MSB is less than the write pointer also considered without the MSB. However, when the current value of the source address without the MSB is greater than the write pointer considered without the MSB then the MSB is switched.

Thus, referencing again FIG. 11A, with the write pointer at A-700, when the source address is between A-699 and A-0000 the current value of the MSB is used. However, with the write pointer at A-700, when the source address is between B-1023 and B-700, the MSB is switched.

Implementation of the above will now be described with reference to FIGS. 13 and 14. FIG. 13 is a simplified diagram of a time slot interchanger according to the teaching of the invention. It contains an information memory 121 storing the source data from each of the ports, to be output to a designated port. It also contains a connection or address memory 123 storing the port-port connection data. A time slot counter 125 is provided to provide the memories with time slot information.

It will be recalled that each source port occupies a fixed time slot within a switching frame. Each timeslot associates to a unique memory address. Thus, timeslots are mapped to memory addresses and the time slot counter is used for this purpose. Over the course of a frame, each source port writes to its unique address within the information memory 121. The information memory is designed such that it is accessible for both information sample writing and information sample reading, for every port, each frame.

Likewise, each output or destination port occupies a unique timeslot. Output timeslots associate to physical addressees in the output connection look-up memory. The timeslot counter maps Output time slots to connection memory cells. While the information memory contains data samples from source ports, the connection memory contains the source addresses for the output ports. Over the course of a frame, the connection memory output data is applied as addresses to the information memory. The connection memory entries are established by the host call-processor.

By way of example, let it be assumed that ports assigned to timeslots 12 and 25 are to interconnected to permit communications therebetween. Thus, in timeslot 12, information from timeslots 12's port is written into the information memory, and the connection memory points to the information stored at the address mapped to timeslot 25 as the read address of the information memory. Similarly, at timeslot 25, the information from the timeslot 25's port is written into the information memory and the connection memory points to the information stored in the address mapped to timeslot 12 as the read address of the information memory.

Stated somewhat differently, at timeslot 12, the connection memory presents the contents of its memory cell 12 to the information memory as the read address. In this case it is address 25. The information memory will thus read the contents of its memory cell 25 to the output data stream, which is occurring at the timeslot 12. At timeslot 25, the process is repeated, except that the connection data is now 12. In this way, timeslot 12 receives source data from timeslot 25 and timeslot 25 receives source data from timeslot 12.

As half-frame switching requires only a single memory cell in the information memory for each source timeslot, the memory location may be overwritten with new data each frame and the output connections always receive the freshest data from each source. As full-frame switching requires at least two memory cells in the information memory for each source timeslot, the memory cells are grouped into two buffers per timeslot. Information samples write to one buffer while the output connections read from the other buffer. At the boundary between the arrival at the input of the last timeslot in a frame and the first time slot from the following frame, the buffers serving the input and output data are switched.

The effect of the full-frame switching arrangement is to present all source data generated in a frame to the output connection mechanism as a single indivisible unit. Consequently, where N is the number of source, and destination timeslots, the data in the switch can be considered N channels of 64K band width each to a single channel of NX64K bandwidth or any combination in between. This attribute is necessary for applications which use channels that consist of multiple timeslots, and arrive from terminal equipment of differing multiplex rates. That is, the full-frame mode is used for any connection involving devices which use different multiplex rates and connect more than one timeslot as a single logical identity.

As the integrated network switch of the present invention has the capacity of operating in either the half-frame or full-frame mode, depending on the peripherals being used, the circuitry of FIG. 14 may be used to properly set the MSB of the connection address to assure reading of the most recent sample when in the half-frame mode.

The circuitry of FIG. 14 shows the interconnections between the connection memory 123 and the information memory 121 in greater detail. One bit of each source address in the connection memory consists a operating mode flag bit. For example, a "0" bit may designate the half-frame mode, while a "1" bit the full frame mode. In all, the source address may consist of 10 bits, one being the operating mode pointer. The operating mode pointer $\underline{X}$ is input to function register 131. The function register also receives the output $\underline{Y}$ from a magnitude comparator 133 and the MSB $\underline{Z}$ of the write address from the write pointer 135. The function register provides an output $\underline{F}$ based on the following function table.

| X | 0 | 0 | 0 | 0 | 1 | 1 | 1 | 1 |
|---|---|---|---|---|---|---|---|---|
| Y | 0 | 0 | 1 | 1 | 0 | 0 | 1 | 1 |
| Z | 0 | 1 | 0 | 1 | 0 | 1 | 0 | 1 |
| F | 0 | 1 | 1 | 0 | 1 | 0 | 1 | 0 |

Thus, when the half-frame mode is directed by the operating mode bit X being in the "0" logical state, and the read source pointer address is greater than the write pointer address setting the Y bit to a logical "1", the function bit F is the inverse of the MSB of the write pointer. The function bit F will be the MSB of the read address to the information memory. Therefore, setting the function bit to the inverse of the MSB of the write pointer places the read address in the opposite hemisphere to that in which the read address lies.

In the full-frame mode, designated by the operating mode pointer assuming the logical "1" State, the function bit F will always take the inverse of the MSB Z of the write pointer. This should be apparent, as in the all-frame mode, the read frame is always in the frame wide buffer not being written into.

Flexible Serial Packet Transfer

As above described, in addition to PCM signaling, the integrated network switch transmits digital data over a digital channel. Digital data includes control information and other data required for proper system operation. In one example, a peripheral device may include an LCD display for providing the user with a visual display of alpha-numeric information. In the conventional switch, digital data transfer was over fixed serial packet transfer (SPT) channels.

According to a feature of the present invention, SPT channels, one per port, are made elastic. More specifically, with the conventional arrangement, each channel is synchronized, meaning there can be no breaks in the message stream. Further, the buffer size is preestablished to hold the maximum message length. The buffer size is set by the active processing unit based on the peripheral type, which then defines the maximum message length. The disadvantages of such a conventional system are apparent to one skilled in the art.

Figure 16:
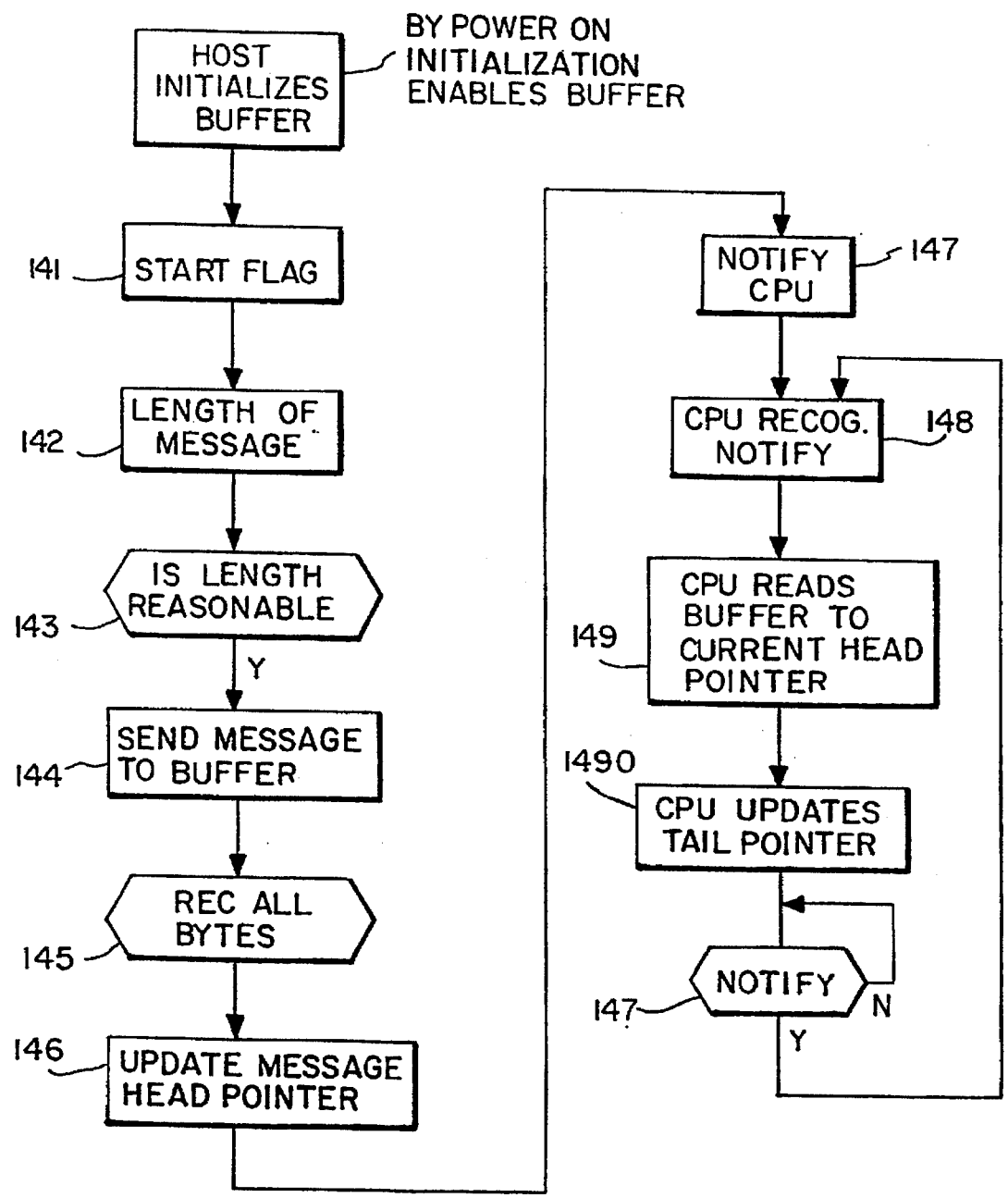
FIG. 16 is a flow diagram of the SPT message read out according to the teachings of the invention.

The improved SPT data transmission system of this invention will be understood from the following description and with reference to FIGS. 15A, 15B and 16. The improved SPT system of the integrated network switch of the invention provides a flexible means for the transport of data to and from peripheral devices to the central processor. More specifically, the improved SPT mechanism described herein provides a system by which message based information can be transported between the switch's central processing unit and the peripheral devices. It employs fixed rate bearer channels of 8 kilobits per second to transport statistically distributed messages. Groups of two, four, or eight channels can be aggregated together to form bearer channels of 16, 32, or 64 kilobits per second.

To effect the above there is provided for each channel a buffer system which provides two seconds of elastic storage, independent of bearer rate. Aggregation of bearer channels into higher rate channels is register programmable under control of the central processor.

Thus, the improved SPT system provides a mechanism by which to transport and buffer statistically occurring data from a plurality of terminal devices at varying data rates, while being able to programmably assign bandwidth to a given logical channel.

The elastic store appears as a circular buffer. A multitude of such circular buffers appear within a larger linear buffer represented diagrammatically in FIGS. 15A and 15B. The buffers are grouped into sets. Each buffer set has a fixed product of buffer size multiplied by the number of member buffers. Each logical buffer within the set appears as twice the size of the physical buffer actually employed. The foregoing can be better understood with reference to FIGS. 15A–15B.

In FIGS. 15A–15B, the write pointer is defined as the current position used by the hardware to write data to the buffer. The head pointer is the position in the buffer corresponding to the end of the last complete message received by the hardware. The tail pointer is the position in the buffer corresponding to the last position read by the central processing unit. The buffer is depicted as a closed loop in FIG. 15A.

As an initial condition shown in FIG. 15A, the head pointer and the tail pointer are at the same position, and the write pointer is at the next buffer memory cell. As a message is received, the write pointer moves around the loop. In FIG. 15A, this is shown by the counter-clockwise arrow. When the message is completely received, the head pointer is set to the position of the write pointer as shown in FIG. 15B, as the write pointer is at this point in time at the end of the last message received. The central processing unit is notified of this event.

The message contains a message length field. With reference to FIG. 16, after a peripheral sends a start flag 141 it sends a signal to the central processor unit indicating the length of the message 142. If the message length is acceptable 143, the message is sent to the buffer 144. After the entire message is received 145, the head pointer is updated to the write pointer 146 as above mentioned and the central processing unit is notified 147. After recognizing the notification 148, the central processing unit reads the buffer to the current head pointer 149, that is to the point in the buffer corresponding to the end of the last received message. As this process proceeds, the tail pointer is updated by the central processing unit.

The system operates in a similar manner when the central processor unit communicates with a peripheral. The head pointer in this case is the last point of a complete message written by the central processor unit. The tail pointer is the last position read out of the buffer to the peripheral.

Thus, buffers are effectively elastic. That is, it is not necessary as it is with the conventional integrated switch to wait a time sufficient to fill the entire buffer before a read operation can begin. Instead, the read operation begins immediately after a complete message is received. This is accomplished by causing the head pointer to be updated to the write pointer as soon as a complete message is received and by notifying the central processor unit that the head pointer has been updated as soon as it is. The central processor unit begins read out of the message immediately upon receipt of the head pointer update. Multiple messages can be stored in each circular buffer, and transmission can occur simultaneously with reads. This is not possible with the conventional switch.

As mentioned above, the buffers are grouped into sets to effect variable buffer lengths. The length of the buffer is initially set to correspond to at least 2.048 seconds times the transmission rate of the channel. Thus, for a 1 kilobyte per second channel, the buffer length is at least 2.048 Kbytes. For data rate of 2 kilobytes per second the buffer length is set to be at least at 4.096 kilobytes. Similarly, for a data rate of 4 kilobytes per second the buffer length is at least 8.192 kilobytes, while for a data rate of 8 kilobytes per second the buffer length is at least 16.384 kilobytes.

Further, a buffer set may be based on a port grouping of 32 ports. Where the data rate is 1.024 kilobytes per second, there would be 32 buffers each having a length of 2.048 Kbytes. Should the data rate of the set be doubled to 2.048 kilobytes per second, the set would be reconfigured as 16 buffers each of a length of 4096 Kbytes. Likewise, when the data rate is 4.096 kilobytes per second, the set of buffers is configured as 8 buffers each at a length of 8192 Kbytes. Should the data rate be increased to 8.192 kilobytes per second, the buffers of the set would appear as 4 buffers each 16,384 Kbytes in length.

It can be seen from the above that the elastic nature of the buffers allows them to be reconfigured into varying length buffers depending on the data rate of the incoming data.

Another feature of the improved SPT system of the invention allows the buffers to exhibit a phantom appearance. That is a 2K buffer can appear as two 2K buffers, a 4 k buffer can appear as two 4K buffers, etc. This feature and the advantages achieved thereby can be explained as follows.

Let a 250 byte message be assumed. Let a 2048 byte buffer also be assumed. Let it be further assumed that the write pointer is at memory cell address 2000 of the buffer assigned to the channel. Recalling that the buffer is 2048 bytes wide, 48 bytes could be written into the buffer containing address 2000. But for the following feature of the improved integrated network switch described herein, the remaining 202 bytes would be wrapped around to addresses 0 through 201 of the buffer. Since this operation requires the computer to see a boundary, it creates more work for the computer and slows its processing down.

To solve this problem, the integrated switch includes a mechanism by which the computer recognizes addresses 2048–4095 as memory cell locations 0–2047. The mechanism operates as follows.

For any address, one significant bit is ignored depending on the size of the buffer. For example, assume a 2048 byte buffer, presenting addresses 0–2047. The difference in the binary representation of the addresses between 0 and 2047 and addresses between 2048 and 4095 is the value of the bit in the A11 position of the address. When the A11 bit is 0, the addresses point to the addresses 0–2047. However, when the A11 bit is a 1, the addresses point to addresses 2048–4095.

Therefore, the system of this integrated network switch operates to disregard the most significant bit of the data address. In other words, no boundary is recognized by the central processor. In the above example, when the 250 byte message is to be written into the 2048 byte buffer it is provided addresses 2000–2250. However, the hardware discards the A11 bit in the write pointer.

Therefore, when the address reaches 2048 which in binary is (LSB)00000000001(MSB), the MSB "1" is disregarded. As a direct consequence the write pointer points to address 0 effectively creating the wrap around with the necessity for the central processor to recognize a boundary. That is the 2048 byte buffer looks to the system as a buffer twice that size.

When the buffer is configured as a 4096 byte memory, the A12 bit of the address is disregarded by the system. Similarly, when the buffer appears as an 8192 byte memory the A13 bit of the address is disregarded. For a 16,384 byte buffer the A14 bit is disregarded.

The above described arrangement permits the buffer set of length 64K bytes to be configured as either 2K, 4K, 8K or 16K buffers, based on the data rate and permits the central processor to operate efficiently, and independent of buffer boundaries so that an incoming message can begin at any point in the memory space of the buffer assigned to that channel. This means that there is no wasted buffer space, and the read operation can begin at any point in the buffer. This is contrary to the conventional system wherein the read operation begins at the beginning of the buffer requiring a fixed buffer length with the attendant inefficiencies.

Processor Identification

The integrated network switch also includes a mechanism by which different central processor units of the common control can be identified when the backplane bus does not provide slot identification. In the preferred embodiment, the identification of the central processor units is made on a VME backplane. VME is an abbreviation common in the art and it stands for Versa Module Eurocard. The Versa Module Eurocard is a conventional, off-the-shelf Common ("C") Bus for integrated switch controllers. Connections to the C-Bus include the CPU board(s), the memories, and the C-Bus Service Unit (VCSU) as shown in FIG. 3. The VCSU provides a communications interface between the call processor and the telephony control unit.

Figure 17:
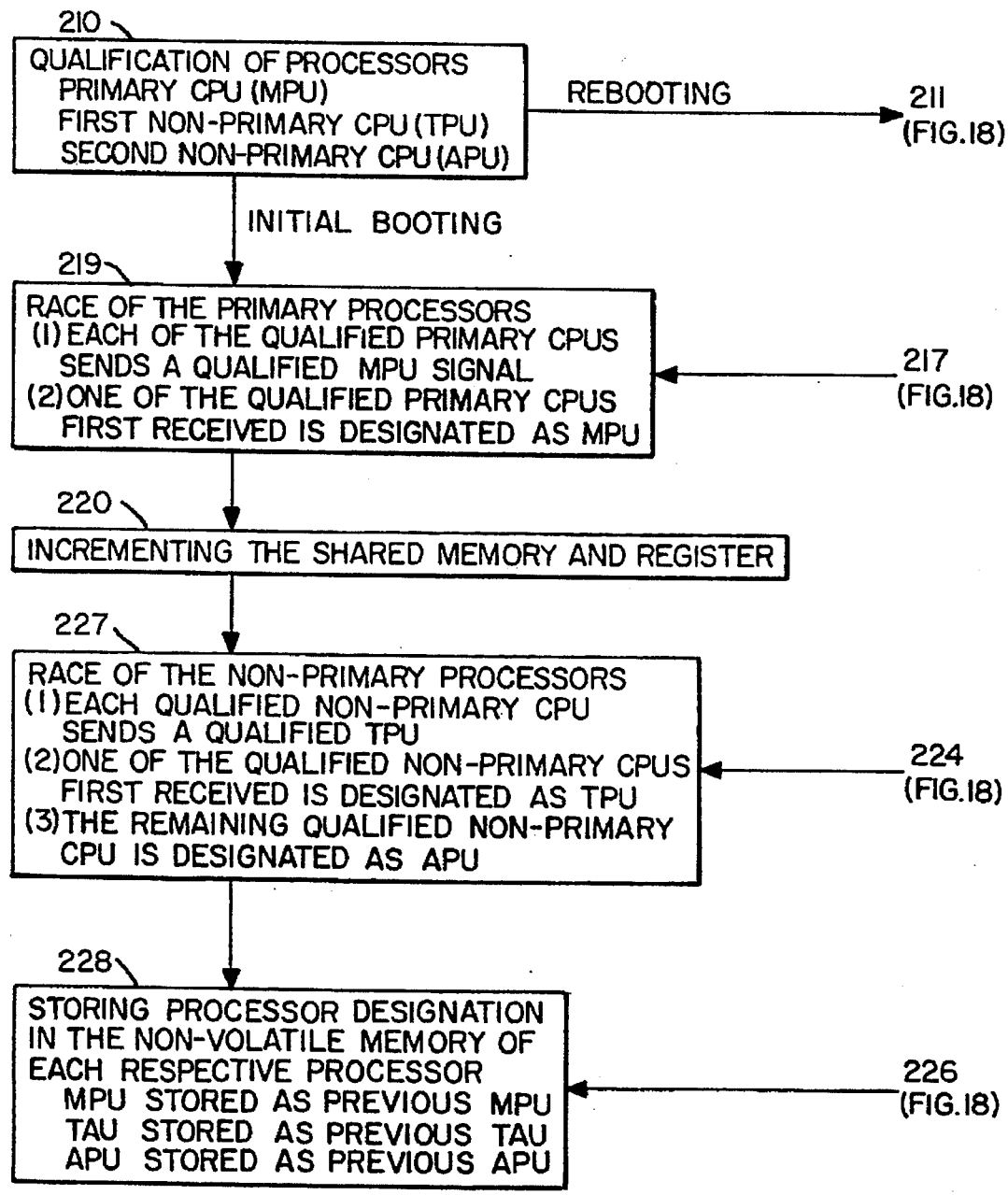
FIG. 17 is a flow diagram illustrating steps involved in designating processors during the initial booting stage of the system.
Figure 18:
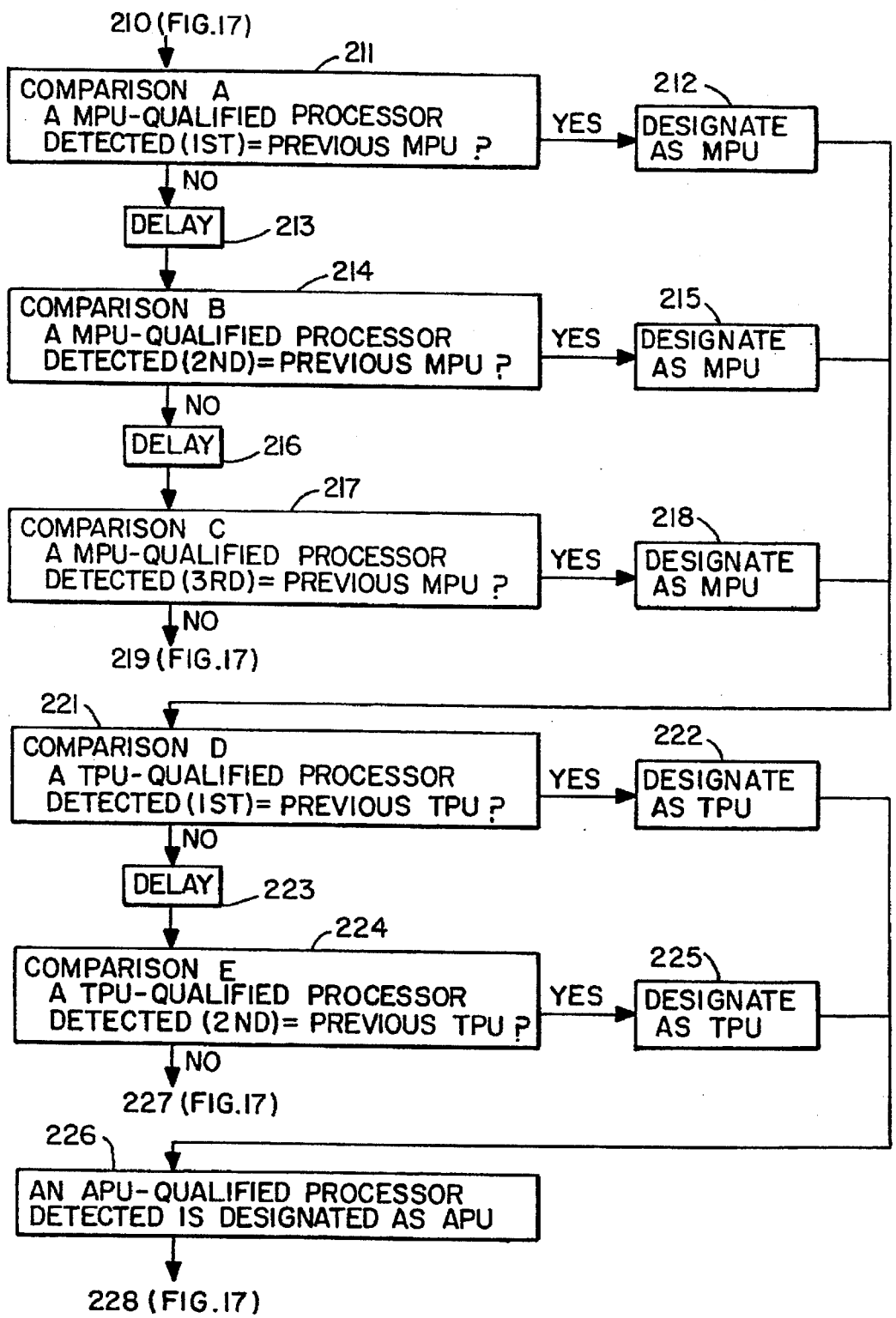
FIG. 18 is a flow diagram illustrating steps involved in designating processors during the rebooting stage of the system.

As explained herein above with reference to FIG. 2, and FIGS. 17–18 circuit boards are plugged into physical slots contained in shelves. One of the shelves is a Common Equipment Shelf for the Call Processor Unit and the Telephony Control Unit. The C-Bus is on the backplane of the slots for the Call Processor Unit and assist in providing the common control.

In a conventional switch each physical slot represents a unique function. Thus, slot identification labels the function of the board placed in the slot. For example, as shown in FIG. 2, slots 3, 5, and 7 of the Call Processor Unit portion of the Common Equipment shelf are for VCPUs (Virtual Central Processor Units). Three slots may be provided for central processing units for while the integrated network switch is operable with a single central processor unit, it may advantageously function with three central processor units, the processing being shared between them. Thus, there may be provided a master cpu or Master Processor Unit (MPU) which controls the system hard drive, a telephone cpu or Telephony Processor Unit (TPU) which controls the telephony control system, and an auxiliary cpu or Auxiliary Processor Unit (APU) which runs the call processing and resource programs (CAP/RAP) mentioned above.

However, with the VME type common bus, no slot identification is provided. In other words, shelf slots are not uniquely identified to particular functions. It is possible to assign each cpu a specified function and program the identification of that specified function into the cpu. However, that approach suffers the disadvantage that on failure of a cpu its function can not be transferred to one of the co-existing cpus in the system.

A feature of the present invention allows for each cpu to function as any one or more of the system's cpus. In other words with a three cpu system, each of the cpu's can operate as the MPU, and/or the TPU, and/or the APU. According to this feature of the invention, each cpu is automatically identified on system initialization based on a unique cpu identification system as discussed herein. The cpu identification is made independent of any slot placement and without programming identification information into the cpu. As a consequence, the cpus need not be placed in any preassigned shelf slots, and each can operate as either the MPU, the TAU or the APU.

According to this aspect of the invention, a cpu (P1) may have an associated qualification. For example, the MPU may be configured to control the system hard drive. It is assumed that there is only one hard drive for the system. The connection to the hard drive can be designated as the qualification. Initially, all processors will attempt to be the MPU (P1) cpu 219. However, two things will restrict them. First, on line 9 of the following described pseudo code, the processor must qualify 210 (i.e., have a hard drive attached). Second, as shown on line 10 of the below described pseudo code if the cpu was not previously an MPU 211, 214 (i.e., P1) it will delay 213, 216 trying to capture the P1 position giving the previously identified MPU time to identify itself. Thus, whenever the system is rebooted, the MPU will initialize globally without interference from the other cpus.

There does not have to be a qualification for processor identification. Assume no qualification associated with the P1 cpu. In the case where a cpu was the previous P1 cpu, it will win the race because of the delay before the other cpus begin their race to become the P1 cpu. On the other hand, if none of the processors were the P1 processor 211, 214 and 217, the race 219 will begin and will be won by one of them that will become the P1 processor. On subsequent reboots, the P1 processor will retain that position by the fact it will always win the race to become the P1 processor due to the delay before the other cpus begin their race 227 to be the P1 processor.

In general, for a race to occur two things must be true. First, there are two or more cpus with the same qualifications. If only one of the cpus has the qualification, then that cpu will automatically be designated the P1 cpu. Second, there are two or more cpus with the same previous identification (e.g., MPU, TPU, APU, or unidentified).

To implement the multiple processor identification feature of the invention, the following hardware components are implemented. First there is provided a shared RAM 220 for the multiple processors. The shared RAM is made accessible to all processors on the bus at a fixed location. Second, there is provided an initialized hardware register 220 for processor identification. This register is also made accessible to all processors on the bus at a fixed location. Third, each processor must itself contain a permanent (i.e., non-volatile) memory 228.

On initialization, the MPU initializes the shared memory and sets it to zero. After MPU initialization, the initialized hardware register is incremented to 001. When the memory increments to 001 the remaining processors begin a race to turn on and assume the TPU and APU positions, respectively, and in that order. The next cpu to turn on will be designated the TPU, and the last to turn on will be designated the APU.

To assure that a previously designated TPU will assume that same status on reboot, the system operates to build a short delay 223 into the cpu which previously was the APU. The cpu knows its last assignment by the code stored in its non-volatile memory. Thus, the race is fixed and the previously designated TPU will always win. This assures that the previous TPU will assume that position on each reboot. It also permits the previous APU to assume the TPU position if the TPU has been removed and to assume the MPU position if the previous TPU and MPU have both been removed.

In general, the system of the improved integrated network switch of this invention can uniquely and consistently identify processors on a bus which does not provide relative position information (viz., slot number). It also allows dynamic reallocation of a processor's identification based on a consistent pattern. This allows processor boards to be removed and added to the bus without hard coded configuration. In the case where one or more processor boards fail, the system allows for the other processors to compensate for the missing processors on a subsequent initialization. The unique identification of each processor allows for simple distribution of the tasks between the processors. The consistent identification of each processor facilitates the debugging of each processor separately. For example, an in-circuit emulator could be attached to a specific processor which would be reliably identified as the same processor on subsequent initialization of the bus.

The unique system also allows each processor to be qualified by local resources. For example, only processors with mass storage devices can be identified as the MPU or processor number 1 (P1). This guarantees that certain resources will be available on specific processors making task distribution simple.

As above mentioned, the hardware components for this feature of the invention include (1) a shared RAM accessible to all processors on the bus at a fixed location, (2) an initialized hardware register accessible to all processors on the bus at a fixed location, and (3) a permanent, i.e., non-volatile memory, on each processor.

When the bus is initialized, each processor on the bus-will be consistently identified according to a fixed pattern. For example, if there are two processors on the bus, one will be always identified as the MPU (or generally the P1) processor, and the other as the TPU (or generally the P2) processor. As additional processors are added to the bus they will be identified as $P_{n+1}$, where n is the number of processors already on the bus. If $P_n$, is removed all processors $P_m$ where m>n will become $P_{m-1}$ on a subsequent initialization. Further, any processor can have a qualification function. For example, P3 can be qualified for mass storage, i.e., Qualify (P3)=Mass Storage.

Implementation of the above with the described hardware can be accomplished with the following functions and procedures used in a pseudo code.

Qualify(processor number) is true if the current processor meets the criteria to be that processor. Otherwise, it returns false.

PreviousId( ) returns the previous ID of the current processor (i.e., P1,P2,P3,etc.) from the processor's non-volatile memory.

Store(processor number) stores the processor number in that processor's non-volatile permanent memory.

Signal(semaphore number) returns true if a semaphore for the specified processor is successfully set. Otherwise it returns false. Subsequent processors will wait for the first processor to signal a "go ahead" before continuing. During this time it is appropriate for processor P1 to initialize all shared resources. The semaphore for P1 is an initialized hardware register which can contain at least three values; unset, set, and "go ahead".

Test(semaphore number) returns true if the semaphore for that processor is set. Otherwise, it returns false.

Delay( ) provides a short delay which will compensate for small variations in the start up time of each processor.

With the above functions and procedures, the following pseudo code is implemented.

1. processor-number←0
2. processor-identified←false
3. while (processor-number◄ MAXIMUM-PROCESSORS) and (not processor-identified)
4. begin
5. processor-number←processor+1
6. if processor-number then
7. while (not Test(goahead).
8. wait
9. if Qualify(processor-number) then
10. if PreviousId( ) processor-number then
11. Delay( )
12. ??? if Signal (processor-number) then
13. processor-identified←true
14. StoreId(processor-number).
15. end
16. if processor-number=1 then
17. initialize shared memory
18. Signal(goahead)

It can be seen from the above that if on initializing the bus the first processor initialized is P1, then the additional processors will reinitialize as P2, P3, etc., corresponding to their previous identifications (assuming they remain on the bus and have not malfunctioned).

However, if, for example P1 has been removed, the operations proceeds as above described to cause the remaining processors on the bus to begin to turn on. They thus race to turn on first. The first to turn on will become the P1 processor, and the next to turn on the P2 processor, etc.

The invention has thus been shown and described with reference to the specific embodiments. However, it should be noted that the present invention is in no way limited to the details of the embodiments but changes and modifications may be made within the scope of the invention as defined by the appended claims.

What is claimed is:

1. In an integrated network switch including:
a plurality of processors each capable of being one of primary and non-primary processors associated with a system backplane, one of said processors to be identified as a primary processor, none of said processors being designated default primary processor in said system, said backplane accommodating said processors in any of several positions, none of said positions being specifically dedicated to any of said processors, said switch including means for automatically designating each of said processors connected to the backplane, said automatic designating means including:
means associated with a selected processor for providing said selected processor with a prior primary processor indentifier designated during system boot-up identifying that processor as the primary processor after system reboot;
means in said switch to detect said identifier; and
means in each non-selected processor not provided with said identifier to delay an attempt to assume the primary processor position,
whereby the selected processor with the identifier is identified as the primary processor and the remaining non-selected processors assume processor positions based on the delays associated therewith.

2. In a system with multiple processors each capable of being one of primary and non-primary processors, said system having a backplane with multiple processor positions for accommodating said multiple processors, none of said processor positions being specifically dedicated to any of said processors and none of said processors is designated as default primary processor in said system, one of said processors to operate as a primary processor, said system comprising:
means for designating each of said processors connected to the backplane as primary processor or as a non-primary processor independent of the processor position on the backplane;
said means for designating each of said processors comprising:
means for providing a selected processor with a prior primary processor identifier designated during system boot-up identifying that processor as the primary processor after system reboot; and
means for providing each of the remaining non-selected processors with a delay function delaying the time each of the remaining non-selected processor seeks to perform a system function after system reboot,
whereby the selected processor is designated by the system as the primary processor upon detection of said identifier and the other non-selected processors assume system functions based on the delay associated with each of the remaining non-selected processors.

3. The multiple processor system as claimed in claim 2, wherein said system is an integrated network switching system.

4. The multiple processor system as claimed in claim 2, wherein said identifier includes an identification of the processor configured to control a system hard drive.

5. In a system with multiple processors each capable of being one of primary and non-primary processors, said system having a backplane with multiple positions for accommodating said multiple processors, none of said multiple positions being specifically dedicated to any of said processors and none of said processors being uniquely assigned a system function nor being designated as default primary processor in said system, one of said processors to operate as a system primary processor, the other processors to operate as lower level processors, said system comprising:
means operable when the system is booted for causing each of said processors to seek recognition as primary processor;
means for designating the first processor detected by the system when the system is booted as the primary processor;
means for assigning to said primary processor an identifier which identifies said primary processor as a prior primary processor designated during system boot-up identifying that processor as the primary processor after system reboot; and
means for assigning all other processors positioned on the backplane a delay function delaying the time the processor seeks to perform a system function after the system is rebooted.

6. The multiple processor system as claimed in claim 5 further including,
means for detecting said qualification identifier on system reboot,
means for designating the processor with the detected qualification identifier as the primary processor, and
means for causing each processor other than the primary process to delay acquiring a system function for a period corresponding to the processor delay function.

7. The multiple processor system as claimed in claim 5, wherein said system is an integrated network switching system.

8. In a system with multiple processors each capable of being one of primary and non-primary processors, said system having a backplane with multiple positions for accommodating said multiple processors, none of said multiple positions being specifically dedicated to any of said processors and none of said processors being dedicated to a system function and none of said processors is designated as default primary processor in said system, a method for assigning each of said processors, a system function comprising:
providing a selected processor with a prior primary processor indentifier designated during system boot-up identifying that processor as the primary processor after system reboot;
detecting said identifier on system boot; and
providing each of said processors other than said selected processor with a delay function delaying the time the processor seeks to perform a system function after system reboot,
whereby the other processors other than the processor with the identifier is caused for perform system functions based on the delay associated with the processor.

9. In a system with multiple processors each capable of being one of primary and non-primary processors, said system having a backplane with multiple positions for accommodating said multiple processors, none of said multiple positions being specifically dedicated to any of said processors and none of said processors being uniquely assigned a system function nor being designated as default primary processor in said system, one of said processors to operate as a system primary processor, the other processors to operate as lower level processors, a method for assigning each of said processor a system function comprising:

when the system boots up, causing each of said processors to seek recognition as the primary processor;

designating the first processor detected by the system when the system boots up as the primary processor;

assigning to said primary processor an identifier which identifies said primary processor as a prior primary processor designated during system boot-up and that processor as the primary processor after system reboot; and assigning all other processor positioned on the backplane a delay function delaying the time the processor seeks to perform a system function after the system is rebooted.

10. The method as claimed in claim 9 further including, detecting said qualification identifier on system reboot, designating the processor with the detected qualification identifier as the primary processor, and causing each processor other than the primary process to delay acquiring a system function for a period corresponding to the processor delay function.

* * * * *